United States Patent
Lee et al.

(10) Patent No.: US 9,350,877 B2
(45) Date of Patent: May 24, 2016

(54) METHOD AND APPARATUS FOR PROVIDING INTERNET SERVICE CARRYING OUT FEE PAYMENT IN WIRELESS COMMUNICATION NETWORK

(71) Applicants: Samsung Electronics Co., Ltd., Gyeonggi-do (KR); Kyung Hee University Industry Academic, Gyeonggi-do (KR)

(72) Inventors: Ji Cheol Lee, Gyeonggi-do (KR); Sung Won Lee, Gyeonggi-do (KR); Beom Sik Bae, Gyeonggi-do (KR); Han Na Lim, Seoul (KR); Sang Soo Jeong, Gyeonggi-do (KR); Song Yeon Cho, Seoul (KR); Sung Ho Choi, Gyeonggi-do (KR)

(73) Assignees: Samsung Electronics Co., Ltd., Suwon-si (KR); Kyung Hee University Industry Academic, Yongin-si (KR)

( * ) Notice: Subject to any disclaimer, the term of this patent is extended or adjusted under 35 U.S.C. 154(b) by 0 days.

(21) Appl. No.: 14/363,774

(22) PCT Filed: Dec. 6, 2012

(86) PCT No.: PCT/KR2012/010564
§ 371 (c)(1),
(2) Date: Jun. 6, 2014

(87) PCT Pub. No.: WO2013/085312
PCT Pub. Date: Jun. 13, 2013

(65) Prior Publication Data
US 2014/0308918 A1    Oct. 16, 2014

(30) Foreign Application Priority Data
Dec. 6, 2011    (KR) .......................... 10-2011-0129914

(51) Int. Cl.
*H04M 11/00*    (2006.01)
*H04M 15/00*    (2006.01)
(Continued)

(52) U.S. Cl.
CPC ........... *H04M 15/51* (2013.01); *G06Q 30/0267* (2013.01); *H04L 12/1403* (2013.01);
(Continued)

(58) Field of Classification Search
CPC ..... H04M 2215/32; H04M 3/56; H04W 4/24; H04W 12/06
USPC .......................... 455/405, 406, 411; 370/261
See application file for complete search history.

(56) References Cited

U.S. PATENT DOCUMENTS 7,552,194 B2 *  6/2009  Kurihara ............. G06F 17/3089
                                                              709/217

(Continued)

FOREIGN PATENT DOCUMENTS

KR    10-2004-0082116    9/2004
KR    10-2007-0109590    11/2007

(Continued)

OTHER PUBLICATIONS

International Search Report dated Mar. 12, 2013 in connection with International Patent Application No. PCT/KR2012/010564, 4 pages.

(Continued)

*Primary Examiner* — Danh Le

(57) ABSTRACT

The present disclosure relates to a method and an apparatus for an Internet service provider server providing a sponsored service, in which a service provider server pays a mobile communication usage fee in place of a user equipment, and the method for providing the sponsored service comprises: a connection step of selecting predetermined sponsored content so as to provide the sponsored service by means of the user equipment accessing the Internet service provider server; an authentication step of authenticating to the user equipment that the sponsor service is valid by a sponsorship manager, which is a device for managing the sponsor service, connecting with the user equipment on the mobile communication network; a step for the Internet transmitting to the user equipment the sponsored content that comprises in an IP packet either an IspCode, which is pre-allocated by the sponsorship manager for identifying the Internet provider server, or an IspTrfCode, which is pre-allocated by the sponsorship manager for identifying the sponsored service; and a ending step of ending the connection between the user equipment and the sponsorship manager, and the user equipment and the sponsorship manager collecting traffic information with regard to the sponsored service.

16 Claims, 31 Drawing Sheets

(51) Int. Cl.
*H04L 29/06* (2006.01)
*G06Q 30/02* (2012.01)
*H04L 12/14* (2006.01)
*H04W 4/24* (2009.01)

(52) U.S. Cl.
CPC ............ *H04L12/1425* (2013.01); *H04L 63/08* (2013.01); *H04L 63/0807* (2013.01); *H04L 2463/102* (2013.01); *H04M 15/09* (2013.01); *H04M 15/73* (2013.01); *H04M 15/8083* (2013.01); *H04W 4/24* (2013.01)

(56) References Cited

U.S. PATENT DOCUMENTS

| | | | | |
|---|---|---|---|---|
| 7,974,926 | B2 * | 7/2011 | Ohmori | G06Q 20/10 705/39 |
| 2001/0005890 | A1 * | 6/2001 | Nitaki | 713/202 |
| 2002/0107937 | A1 * | 8/2002 | Iyoki | 709/217 |
| 2004/0064337 | A1 * | 4/2004 | Nakahara | G07C 5/008 701/33.4 |
| 2005/0220039 | A1 * | 10/2005 | Hoshino et al. | 370/261 |
| 2007/0174467 | A1 * | 7/2007 | Ballou et al. | 709/227 |
| 2007/0220558 | A1 * | 9/2007 | Jung et al. | 725/62 |

FOREIGN PATENT DOCUMENTS

| | | |
|---|---|---|
| KR | 10-2010-0001019 | 1/2010 |
| KR | 10-2010-0062648 | 6/2010 |

OTHER PUBLICATIONS

Written Opinion of International Searching Authority dated Mar. 12, 2013 in connection with International Patent Application No. PCT/KR2012/010564, 6 pages.

* cited by examiner

FIG. 2
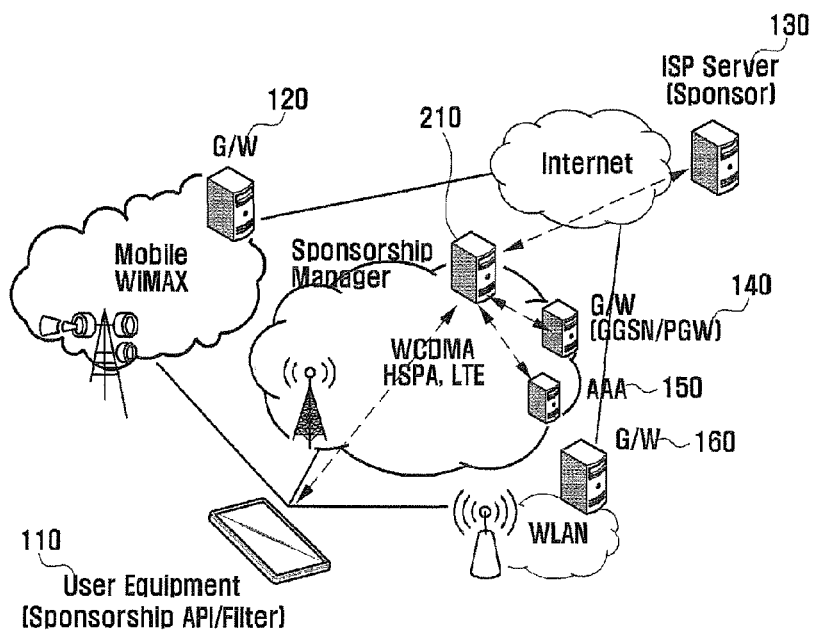
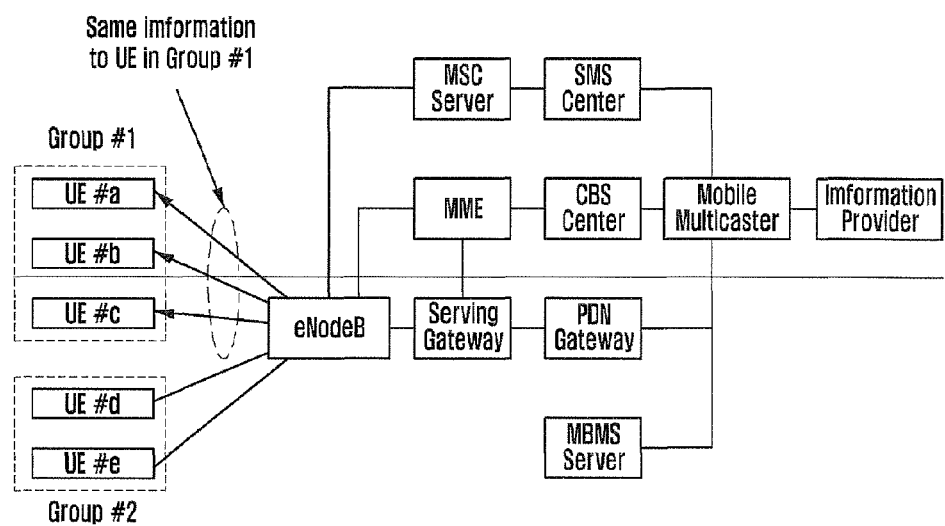

FIG. 4

| Suvscription Info |
|---|
| Sponsorship ID |
| Sponsorship Password |

FIG. 9
(a) filter made up of only IspTrfCode
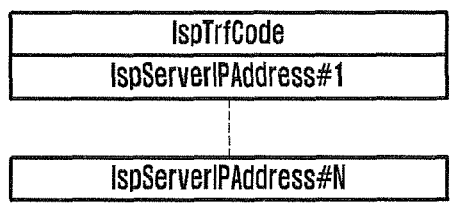
(b) filter made up of IspTrfCode and service server IP address
(c) filter made up of IspTrfCode and UE IP address
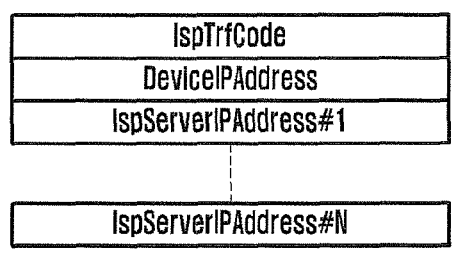
(d) filter made up of IspTrfCode and service server/UE IP address

FIG. 19

| | |
|---|---|
| Sponsorship Service Terminated | |
| ISP ID | Google |
| Service | Instant Messaging |
| Bytes | 1MB |
| Time | 13:00~14:00 |

FIG. 20

| Field | Size (in bits) | Recommended Value |
|---|---|---|
| Copied | 1 | 1 (for all fragmented IP packets) |
| Option Class | 2 | 0 (for control) |
| Option Number | 5 | 0x10101 |
| Option Length | 8 | 24 or 56 |
| Option Data | 24/56 | IspTrfCode |

… (1 / 14)

METHOD AND APPARATUS FOR PROVIDING INTERNET SERVICE CARRYING OUT FEE PAYMENT IN WIRELESS COMMUNICATION NETWORK

CROSS-REFERENCE TO RELATED APPLICATION(S)

The present application claims priority under 35 U.S.C. §365 to International Patent Application No. PCT/KR2012/010564 filed Dec. 6, 2012, entitled "METHOD AND APPARATUS FOR PROVIDING INTERNET SERVICE CARRYING OUT FEE PAYMENT IN WIRELESS COMMUNICATION NETWORK". International Patent Application No. PCT/KR2012/010564 claims priority under 35 U.S.C. §365 and/or 35 U.S.C. §119(a) to Korean Patent Application No. 10-2011-01299146 filed Dec. 6, 2011 and which are incorporated herein by reference into the present disclosure as if fully set forth herein.

TECHNICAL FIELD

The present disclosure relates to a method and apparatus for an Internet service provider to pay the mobile communication network usage bill in the user's stead.

In more particular, the present disclosure relates to a method and apparatus for the Internet service provider which provides a mobile subscriber with Internet service using the mobile communication network to pay the cellular network usage bill issued for the corresponding service in the mobile subscriber's instead.

BACKGROUND ART

FIG. 1 is a diagram illustrating communication and mobile communication network usage billing mechanisms between a User Equipment 110 of a mobile subscriber and Internet Service Provider (ISP) server 130 in the conventional technology.

As shown in FIG. 1, when there is a plurality of mobile communication networks available for the User Equipment 110, the User Equipment 110 selects a certain mobile communication network to connect to the ISP server 130.

After completing the use of the Internet service provided by the ISP server 130, the fee of using the mobile communication network for the corresponding service is charged to the owner of the User Equipment 110 and in most cases the owner is an individual. In the case that the owner is an organization such as company, the usage fee is charged to the organization.

In this case, the mobile communication network usage fee is calculated based on the traffic amount flown exchanged through the mobile communication network in most but, sometimes, based on the mobile communication network usage time, service type (e.g. real time service such as voice and video).

In order to support Internet service, the metering of the traffic amount and time and checking the service type is performed by the mobile communication network termination devices such as gateways.

As shown in FIG. 1, the mobile communication networks have respective gateways 120 and 160 at their boundaries in view of the mobile communication network. For example, Long Term Evolution (LTE) as the fourth generation mobile communication standard of the $3^{rd}$ Generation Partnership Project (3GPP) is provided with a PDN Gateway (PGW) 140.

The billing information collected by the gateway devices such as PGW 140 is transferred to a billing server such as Authentication Authorization Account server (AAA) 150 which calculates the fee to be charged and charges the finally determined to the owner of the User Equipment.

DISCLOSURE OF INVENTION

Technical Problem

The conventional technology has a problem in that it is impossible for the ISP to pay the mobile communication network usage fee in the mobile subscriber's instead. For example, the ISP may provide the mobile subscriber with the Internet service in exchange for viewing advertisement and want to pay the mobile communication network usage fee with the benefit from the advertisement, but it is impossible.

The present disclosure aims to solve the above problem. In particular, the present disclosure aims to provide a method and apparatus that is capable of allowing the ISP providing Internet service through the mobile communication network to pay the mobile communication network usage fees on behalf of the mobile subscribers, who use its Internet service, in a way of paying for viewing advertisements. Also, the present disclosure aims to provide a method and apparatus of paying for mobile subscribers in association of various options such as usage time, consumed traffic amount, and individual files.

Furthermore, the present disclosure aims to provide a method and apparatus of paying the mobile communication fee charged for use of the services of third party organizations such as enterprise, university, and public institution as well as the ISP in the mobile subscriber's instead.

Solution to Problem

In order to solve the above problem, the payment method of the present disclosure includes selecting, at the terminal, a predetermined sponsored content for the sponsored service, authenticating, at a sponsorship manager as a device for managing the sponsored service on the mobile communication network, validity of the sponsored service to the terminal, transmitting the sponsored content including at least one of IspCode for identifying the internet service provider server and a IspTrfCode for identifying the sponsored service from the Internet service provider server to the terminal, and releasing connection between the terminal and the sponsorship manager and collecting traffic information on the sponsored service.

The payment apparatus of the present disclosure includes a terminal which selects a predetermined sponsored content for the sponsored service, a sponsorship manager which authenticates validity of the sponsored service to the terminal, allocates IspCode for identifying an Internet service provider server or IspTrfCode for identifying the sponsored service, and collects traffic information on the sponsored service when the connection with the terminal is released, and an Internet service provider server which transmits the sponsored content with IP packets including the IspCode or IspTrfCode to the terminal.

Advantageous Effects of Invention

According to the present disclosure, when an ISP provides User Equipment (UE) with Internet service using a mobile communication network, it is possible for the ISP to pay the mobile communication network usage fee on behalf of the mobile subscriber in exchange for viewing advertisements.

In order to accomplish this, the present disclosure proposes the following techniques.

The first is the technique of managing mobile subscribers interested in use of sponsored services by means of a sponsorship manager as a novel device.

The second is the technique of managing the ISPs interested in providing sponsored services by means of the sponsorship manager as a novel device.

The third is the technique of managing mapping information between the mobile subscribers interested in use of sponsored services and the ISPs providing the sponsored services and executing verification and authentication on legality at the outset of the corresponding service by means of the sponsorship manager as a novel device.

The fourth is the technique of adding a sponsorship filter as a novel function to the legacy UE and PGS to detect illegal sponsored services and collecting statistical information for billing for the lawful services. Particularly, the technique of fabricating filters of various combinations from simple to complex forms using IspTrfCode that are relatively simple in complexity as compared to legacy gateways low in flexibility of diverse combination and high in complexity with the use of combinations of IP addresses and layer 4 ports informations of the transmission and reception terminals based on 5-tuple concept.

The fifth is the technique of allowing the terminal to participate in generating CDR along with PGW to make the billing policy diverse with flexibility.

The sixth is the technique notifying of the start and end of the sponsored service on the security-guaranteed layers such as OS and device driver independently of the sponsored application to guarantee the secure use of the sponsored service with the UE.

According to an embodiment of the present disclosure, it is possible to launch a new business model in which the mobile communication network operator charges the mobile communication network usage fee to the ISP in the mobile subscriber's stead. It is also possible for the ISP to make new benefit using mobile communication and create various types of sponsored service models using the various types of sponsorship filter policies. It is also possible to check the sponsored service-related statistical information on the terminal using the sponsored application developed and distributed by the ISP so as to improve clarity of the billing information of the mobile communication network operator.

BRIEF DESCRIPTION OF DRAWINGS

FIG. 2 is a diagram illustrating the network architecture of a system according to an embodiment of the present disclosure

FIG. 4 is a diagram illustrating the basic mobile subscriber information managed by the sponsorship manager using the database;

FIG. 9 is a diagram illustrating a filtering record of the sponsorship filter;

FIG. 19 is a diagram illustrating an exemplary sponsored service end notification message according to an embodiment of the present disclosure;

FIG. 20 is a diagram illustrating an example of applying IspTrfCode using an option filed of an IP packet header;

MODE FOR THE INVENTION

Figure 1:
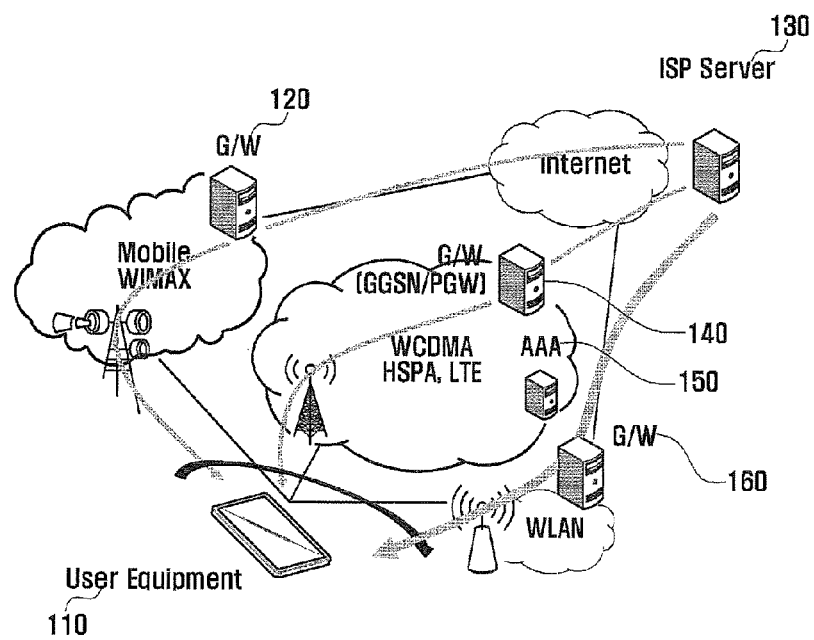
FIG. 1 is a diagram illustrating conventional network architecture in which a UE connects to an Internet service provider server through a mobile communication network.

The present disclosure is not limited to the embodiments described below but may include various modifications without departing from the scope of the present disclosure.

Detailed description of well-known functions and structures incorporated herein may be omitted to avoid obscuring the subject matter of the present disclosure.

The same reference numbers are used throughout the drawings to refer to the same or like parts. Some of elements are exaggerated, omitted or simplified in the drawings. This aims to omit unnecessary description so as to make the subject matter of the present disclosure clear. Exemplary embodiments of the present disclosure are described with reference to the accompanying drawings in detail.

FIG. 2 is a diagram illustrating the network architecture of a system according to an embodiment of the present disclosure. In order to support such system, it is necessary to adopt new technology for compatibility between new and legacy devices.

First, a new device called sponsorship manager is defined in the mobile communication network.

Second, new technologies called sponsorship Application Programming Interface (API) and sponsorship filter are defined in the UE.

Third, the technology of sponsorship filter is defined in the mobile communication network gateway (e.g. device 140 in FIG. 2) as a legacy device as in the UE.

Fourth, a new interface for exchanging control information among the ISP server, gateway, billing server (e.g. AAA server), UE, and sponsorship manager is defined.

Descriptions are made of the respective technologies briefly.

The sponsorship manager as the first newly introduce mobile communication network device is the premises of the mobile communication network operator and responsible for managing the sponsored services in which the ISP pays for the use of the mobile communication network on behalf of the mobile subscriber (e.g. payment based on time and/or traffic amount).

Here, the management means that the mobile communication network operator is capable of managing the mobile subscribers interested in the sponsored service by allocating logical IDs and passwords to the mobile subscribers. In an alternative view, the mobile communication network operator is capable of managing the information on the ISPs interested in providing the mobile subscribers with the sponsored services for identifying the ISPs and charging the mobile communication network usage fee of the mobile subscribers.

In order to accomplish this, the corresponding ISP, like the UE, has to register the unique ISP identifier and password with the sponsorship manager such that the sponsorship manager manages the identifier and password. The mobile subscriber and ISP interested in use of the sponsored service registered as above have to perform a service subscription/authorization mutually through the service subscription procedure independently of the procedure of the present disclosure.

Afterward, the sponsorship manager receives the information on the agreement for the service between the mobile subscriber and the ISP from the mobile subscriber (or the ISP), and performs the operations of 1) verifying the legality of the agreement between the mobile subscriber and the ISP and 2) determining the fee to be charged to the lawful sponsored service with the PGW based on the information.

That is, if the sponsored service starts, the mobile communication network operator does not accommodate the corresponding service immediately but determines whether the sponsored service has been agreed between the mobile subscriber and the ISP and, if so, checks the communication time or traffic amount of the agreed service through PGW.

Finally, the mobile communication network operator generates the billing-basis information based on the file check of the usage time or traffic amount with the assistant of the devices such as terminal and sends the billing-basis information to the billing server.

Second, a new function of calling the sponsored service to be provided by the ISP has to be added newly to the terminal, this function being executed by calling a command called sponsorship API.

The corresponding function includes 1) an initial registration function of generating dedicated ID and password to the sponsorship manager in order for the mobile subscriber to use the sponsored service afterward, 2) a function in which the mobile subscriber completed initial registration with the sponsorship manager is aware of the ISP providing a specific service as the sponsored service, connects to the ISP through the Internet, and registers the corresponding ISP (or specific service of the ISP) with the sponsorship manager with the notification of being ready to receive the sponsored service, 3) a function in which the mobile subscriber notifies the sponsorship manager of the start of the service at the operation start time point of one of the subscribed sponsored services and authenticating the lawful access and validity of the sponsored service (by taking notice of the property of the sponsored service of which support is restricted under the conditions of specific time, specific duration, and specific place), 4) a function of acquiring information on the traffic of the sponsored service or detecting the illegal sponsored service by executing the sponsorship filter 'additionally' in the UE, 5) a function of reporting the information on the transmitted/received traffic of the lawful sponsored service and the illegal sponsored service usage detection information to the sponsorship manager as 'auxiliary function,'

6) a function in which the sponsorship filter monitors transmission/reception traffic to detect the end of the sponsored service and, if no traffic is detected for a predetermined duration, ends the corresponding sponsored service, and finally, 7) a function in which the UE notifies of the start and end of the sponsored service clearly with screen or audio reaction to resolve the anxiety (about whether the ISP pays for the fee and how much the interknit service provider pay in the mobile subscriber's stead).

Fourth, the legacy mobile communication network gateway such as PGW is provided with the sponsorship filter as in the UE. The sponsorship filter reads the IspTrfCode of the traffic transmitted/received through the mobile communication network. This code is issued to the sponsorship manager when the ISP designates a specific service as the sponsored service and registering the sponsored service with the sponsorship manager.

The application service of the UE using the corresponding sponsored service and the server of the ISP insert the corresponding code into the Internet packets carrying the traffic. It may be considered to use a field of the IP packet for containing the code, and description thereon is made later with reference to accompanying drawings.

If an IspTrfCode registered lawfully is detected in the packets transmitted/received through the mobile communication network, the gateway extracts the information on the number of packets transmitted/received or time for use in generating the billing information afterward. If an illegal sponsored service is detected, the gateway blocks the corresponding service and makes a contact to the ISP registered using the corresponding code to prepare for a situation such as illegal attack.

The reason for use of the IspTrfCode is because the code makes it possible to identify the sponsored service without checking the source and destination addresses and port number of protocol such as TCP/UDP. Without this code, it is necessary to transmit the preregistered ISP server IP address or use 5 tuples including all the informations of the ISP and UE, which increases the size of the 5-tuple address list managed for the sponsored services in the PGW and processing complexity.

It is not prefer to use the IP address of the ISP, since the physical information such as IP address is exposed to the mobile communication network operator irrationally and it is difficult to take an appropriate action such as increase of the number of dynamically in correspondence to the abrupt increase of the usage amount of the corresponding service. Recently, in the case of using a plurality of TCP/UDP or operator's own service ports dynamically in one service, it is impossible to correspond those informations to 5-tuple format dynamically.

In the case of using IspTrfCode, it is possible to operate the policy flexibly. That is, it is possible of supporting all the cases of checking only IspTrfCode, checking IspTrfCode and source or destination IP address, checking source and destination IP addresses as if using 5 tuples, checking UDP/TCP port numbers in addition to the IP addresses. From the viewpoint of the mobile communication network operator, this is advantageous in terms of minimizing the load of the mobile communication network and making new benefit.

The sponsorship filter embodied in the PGW may be removed from the PGW so as to be implemented as a separate device. That is, the sponsorship filter may be removed from the PGW and then implemented as a new device arranged between the PGW and the ISP server to accomplish the same effect.

Fourth, the sponsorship manager is provided with a control interface for communication with the UE, the PGW, and the ISP (or ISP server) to support above-described functions.

In addition, the sponsorship manager is also responsible for the function of transferring, when a specific sponsorship service is required to guarantee a specific type of Quality of Service (QoS), the corresponding information to the PGW. In the case of complying with the 3GPP LTE standard, the corresponding information is transferred to the PGW via a Policy and Charging Rules Function (PCRF). Finally, when the sponsored service ends, the sponsorship manager collects billing information in conjunction with the UE/PGW.

A description is made of the operation for supporting the sponsored service according to the present disclosure in detail with reference to an exemplary scenario.

Figure 3:
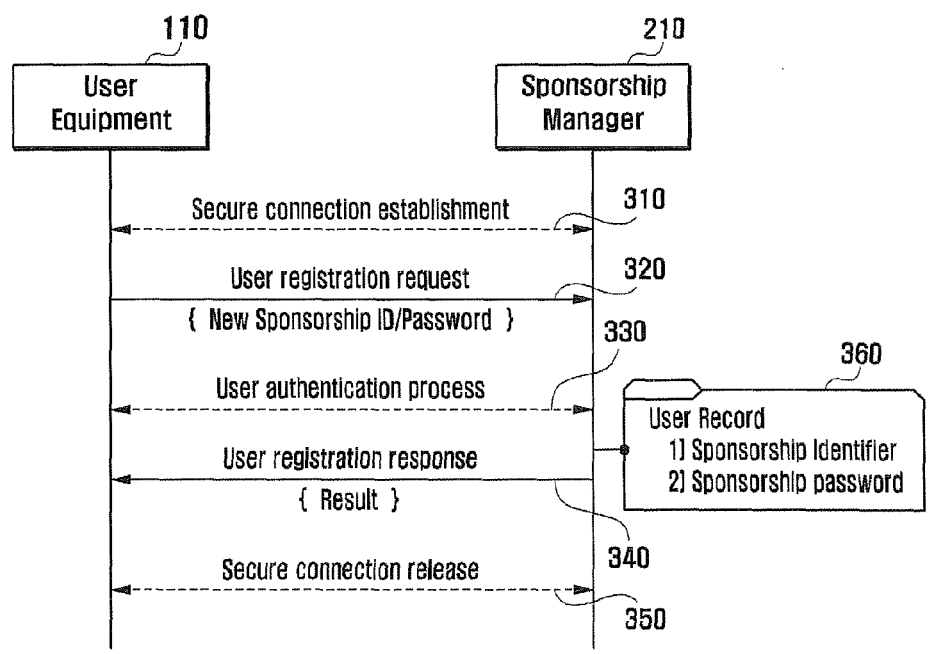
FIG. 3 is a diagram illustrating the initial registration procedure of the UE with the sponsorship manager.

FIG. 3 is a diagram illustrating the initial registration procedure of the UE 110 with the sponsorship manager. If the user is interested in receiving a sponsored service using the UE which has been powered on and operating for usual, it is necessary to register the UE with the sponsorship manager 210.

In detail, this procedure is performed independently of the service of a specific ISP in such a way that the mobile communication network operator checks whether there is any request for the sponsored service from a certain mobile subscriber and, if so, assigns a sponsorship ID such that the mobile subscriber registers the UE with the ISP using the sponsorship ID.

Using such an extra sponsorship ID, it is possible for the mobile subscriber receive the free service without exposure of private information such as identity number of phone number. The sponsorship ID is a logical identifier that may have no time limit or updated on demand by the mobile subscriber.

As shown in FIG. 3, the UE 110 performs secure connection setup with the sponsorship manager 210 for use of the sponsored service at operation 310. This procedure may be performed using the legacy protocol such as IPsec.

Afterward, the UE 110 is allocated a sponsorship ID for use of the sponsored service from the sponsorship manager 210 and registers a password with the sponsorship manager 210. If it fails passing the authentication procedure between the UE and the ISP with the sponsorship ID and password, the sponsorship manager 210 reissues the sponsorship ID and, otherwise, notifies the mobile subscriber of the authentication completion at operation 340.

If there is no problem, the sponsorship manager 210 manages the sponsorship ID and password of the mobile subscriber in a database as shown in FIG. 4.

FIG. 4 is a diagram illustrating the basic mobile subscriber information managed by the sponsorship manager using the database.

As shown in FIG. 4, the UE subscribed to the sponsored service is managed with the sponsorship ID and password issued along with the information on the UE and mobile subscriber.

Figure 5:
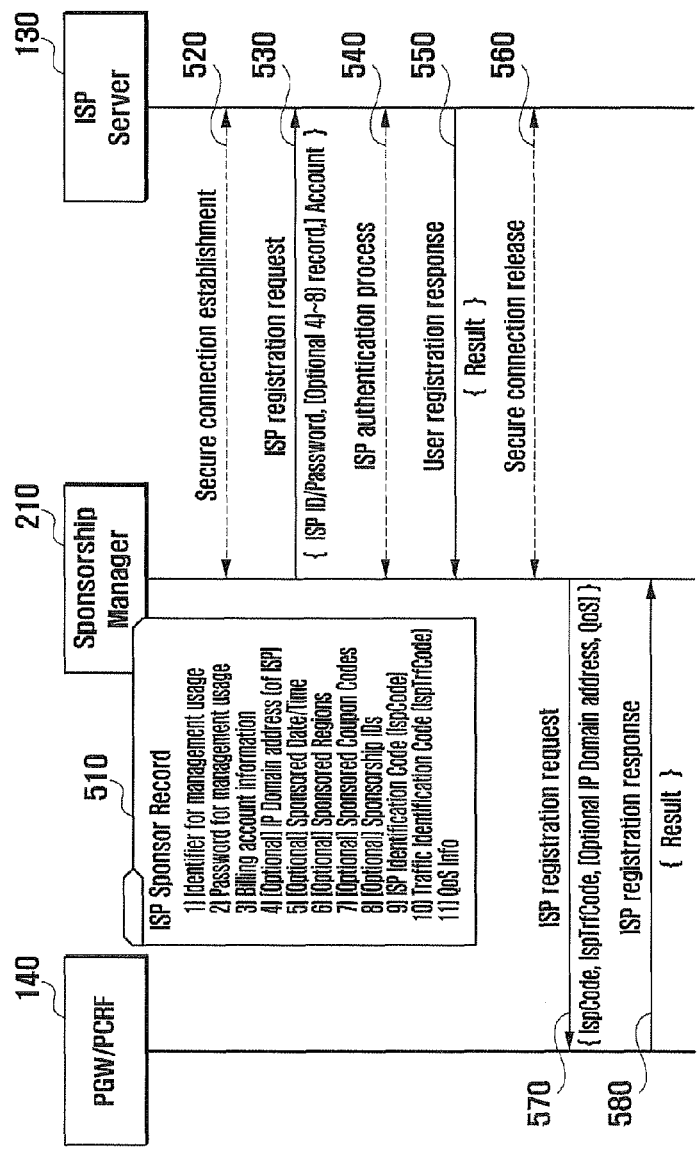
FIG. 5 is a diagram illustrating the initial registration procedure of an ISP with the sponsorship manager.

FIG. 5 is a diagram illustrating the initial registration procedure of an ISP with the sponsorship manager.

As shown in FIG. 5, if it wants to provider a sponsored service, the ISP or ISP server 130 establishes a secure connection with the sponsorship manager 210 at operation 520 and sends the sponsorship manager sends the sponsorship manager 210 the detailed information on the sponsored service at operation 510.

In this case, the ISP 130 generates an ISP registration ID (identifier for management usage at operation 510) and password (password for management usage at operation 510) to the sponsorship manager 210 and for use in sponsorship service subscription and update afterward.

In the procedure of configuring the ISP ID and password, the ISP 130 notifies of the information on the account for the mobile communication network operator to charge the payment for the sponsored service serviced by the ISP 130 (billing account information at operation 510).

As shown in FIG. 5, the detailed supplementary information managed by the sponsorship manager 210 in association with the sponsorship service provided by the ISP may include IP information of the ISP providing the sponsored service, IP address information of the UE receiving the sponsored service, date and time available for the sponsored service, physical location of the UE for receiving the sponsored service, information on the coupon available for consuming the sponsored service, and a ID list for designating UE having specific sponsorship ID.

Further supplementary informations may be singled out and applied. If an ISP 130 is capable of providing sponsored services and if the requested sponsored service is valid. The sponsorship manager 210 allocates an IspCode to the ISP in order for the UEs subscribed to the sponsored service to identify the ISP.

This is the code allocated at the level of ISP such as google and yahoo. The providers may allocate logical addresses for identification of the framework supporting the sponsored service. In addition, the IspTrfCode as a separate code for identification of the sponsored service requested by the IPS.

As shown in FIG. 5, the sponsorship manager 210 stores and manages the aforementioned informations in a database as ISP sponsor record. The sponsorship manager 210 sends the PGW/PCRF the information indicating that the sponsorship service is provided through the PGW 140 using IspTrfCode and specific IP domain at operation 570.

Particularly if the ISP 130 transmits QoS information, this information is also stored/managed in the ISP sponsor record and transferred to the PGW/PCRF 140. The PGW 140 determines whether the lawful sponsored service is being provided, inspect for illegal sponsored service, and collect billing basis information such as traffic/time of the consumed lawful sponsored service.

The mobile subscriber 110 registers the sponsored service with the sponsorship manager 1 210 of the mobile communication network operator as shown in FIG. 4, while the ISP 130 intending to provide the sponsored service registers the corresponding sponsored service with the sponsorship manager 210 of the mobile communication network operator as shown in FIG. 5. A description is made of the procedure for the mobile subscriber to search the Internet for a target sponsored service and subscribe to the corresponding sponsored service.

Figure 6:
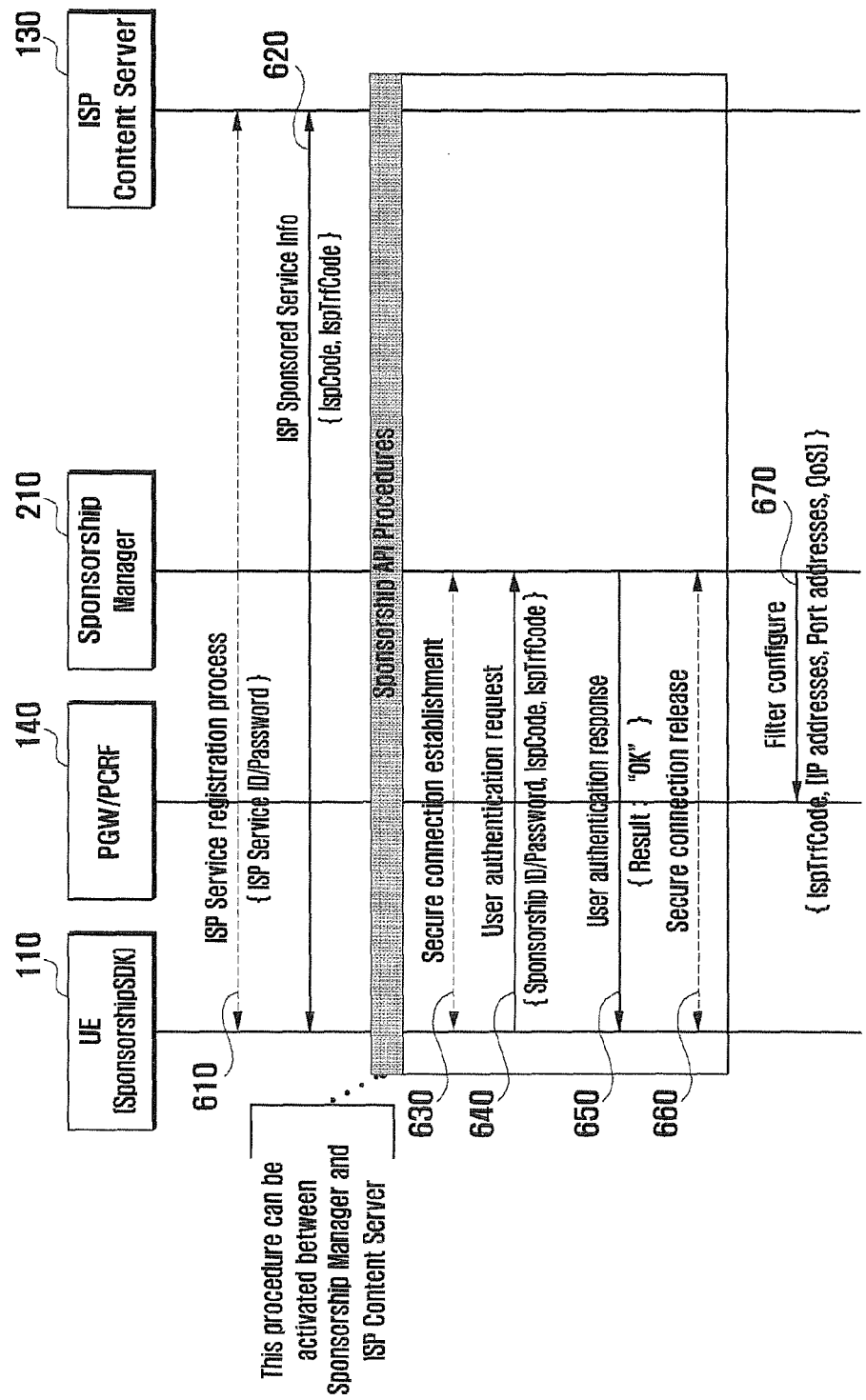
FIG. 6 is a signal flow diagram illustrating a sponsor service mapping procedure between the mobile subscriber and the ISP.

FIG. 6 is a signal flow diagram illustrating a sponsor service mapping procedure between the mobile subscriber and the ISP.

The mobile subscriber 110 connects to the ISP server 130 to register a sponsored service. This procedure is identical with the registration procedure of a subscriber for current network service at operation 610.

If the corresponding procedure has completed, the ISP 130 providing the sponsored service sends the UE its IspCode and the IspTrfCode for the sponsored Service at operation 620.

The corresponding information is processed below the sponsorship API transparently of the applications. This means that the information is processed in a secure area such as inside of the operating system and device drive protected against the application programs. The UE 110 stores the received IspCode and IspTrfCode in a database. That is, the UE 110 manages the IspCode and IspTrfCode associated with the subscribed sponsored service in the form of a database.

Afterward, the UE 110 registers the sponsored service information with the sponsorship manager through operations 630 to 660.

Figure 7:
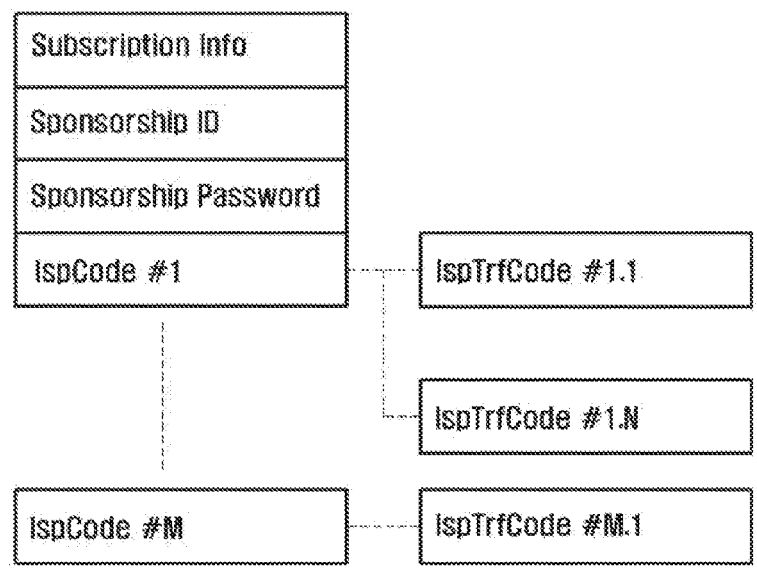
FIG. 7 is a diagram illustrating a structure of the database of the UE for use in managing a plurality of sponsored service.

The sponsorship manager 210 manages the sponsored service to which the mobile subscriber 110 identified with a specific sponsorship ID subscribes additionally with the newly added IspCode and IspTrfCode. FIG. 7 is a diagram illustrating a structure of the database of the UE for use in managing a plurality of sponsored service.

Although not depicted in the drawing, the mobile subscriber may connect to the sponsorship manager to delete any preregistered sponsored service at any time. The mobile subscriber may is prepared for use of the sponsored service of a specific ISP through the above procedure.

In the case that the mobile communication network operator 130 intends to add the information on the individual users in addition to IspTrfCode in monitoring the sponsored service at PGW 140, the sponsorship manager 210 may send the PGW/PCRF 140 a UE-server service session filter information including the information on the corresponding UE 110.

In this way, The PGW 140 is capable of supporting all the cases of checking only the IspTrfCode, source and destination IP addresses along with IspTrfCode, and source and destination IP addresses and UDP/TCP port numbers like 5 tuples. Accordingly, it is also advantageous in terms of traffic minimization of the mobile communication network and contribution of contribution to new benefit from the viewpoint of the mobile communication network operator.

The sponsored service may be classified into a few scenarios depending on their properties.

The first scenario based on the sponsored service property is the scenario called sponsored content delivery in which the sponsored service usage feel is paid in unit of content. This is the case of transmission of specific music/video/data file. A scenario of the sponsored content delivery is depicted in FIG. 8.

Figure 8:
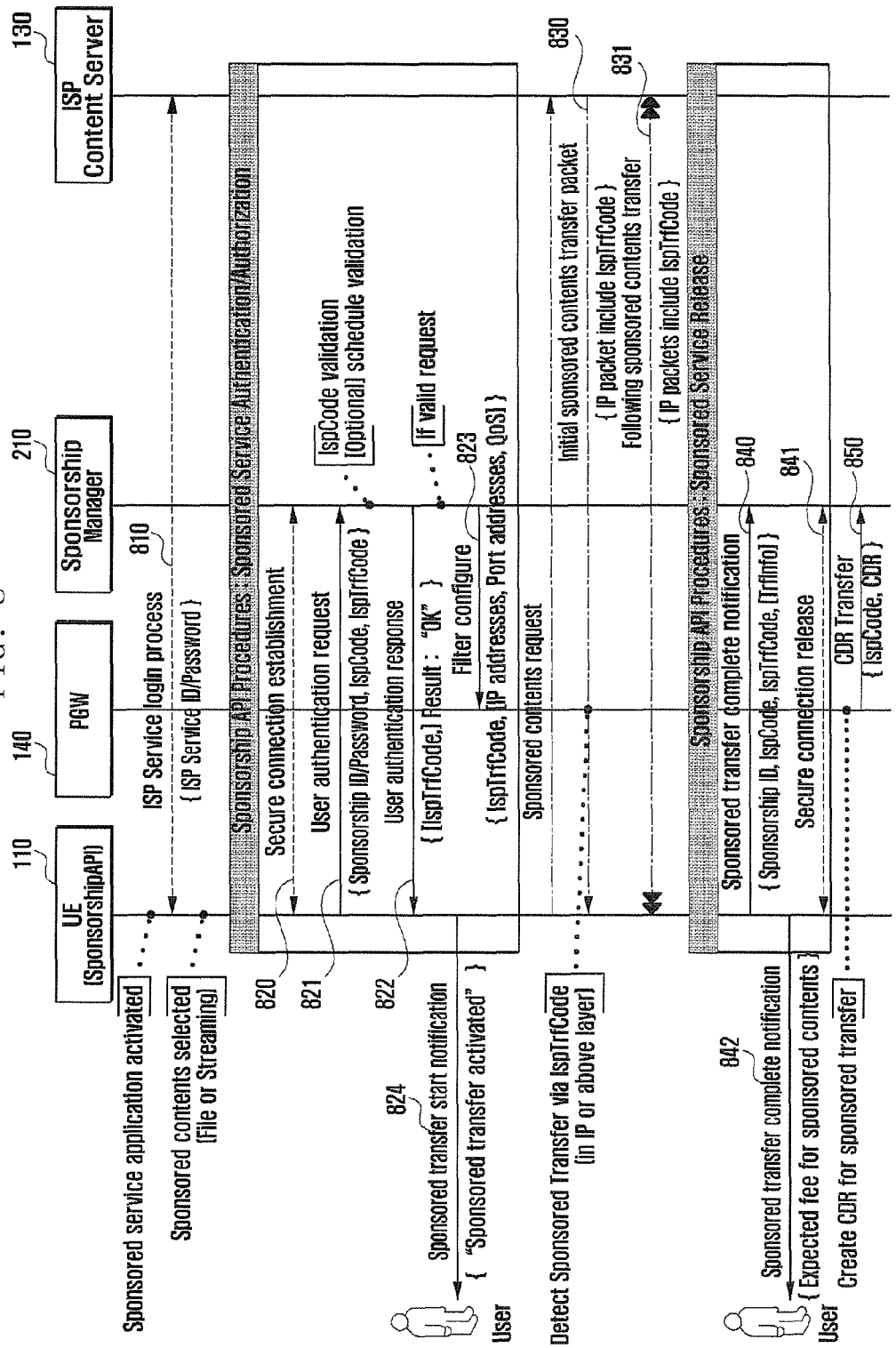
FIG. 8 is a signal flow diagram illustrating the procedure of providing sponsored service with successful start and end.

FIG. 8 is a signal flow diagram illustrating the procedure of providing sponsored service with successful start and end.

As shown in FIG. 8, the sponsored service application running on the UE 110 may connect to the ISP server 130 as a normal Internet service at operation 810. For example, a web browser connects to the web server.

If the mobile subscriber 110 selects a sponsored service content which is paid by the ISP 130 in the subscriber's stead among the services, the authentication procedure for the sponsored content is performed between the UE 110 and the sponsorship manger 210 by the sponsorship API function through operations 820 to 823.

This procedure is performed transparently of applications (sponsored service authentication and authorization procedure) in such a way of establishing a secure communication path between the UE 110 and the sponsorship manager 210 at operation 820 and transmitting the sponsorship IP/password, IspCode of the ISP as the owner of the sponsored content, and IspTrfCode of the sponsored content (user authentication request) from the UE 110 to the sponsorship manager 210 at operation 821.

Although the IspTrfCode may be allocated per content in the case of the sponsored content, typically it is preferred to allocate IspTrfCode to a plurality of contents. If the sponsorship ID and password of the UE is valid, the sponsorship manager checks whether the requested IspCode and IspTrf-Code are of the sponsored content for which the UE has lawfully requested through the procedure of FIG. 6.

If it is determined that the request is lawful, the sponsorship manager 210 transmits OK message in reply (User authentication response) at operation 822.

In the case of transmitting the response from the sponsorship manager 210 to the UE 110, if it is necessary to change the IspTrfCode allocated by the ISP 130 previously for security, the sponsorship manager 210 stores the corresponding information as shown in FIG. 5 and then sends the response including IspTrfCode as supplementary information to the UE 110 as shown in FIG. 8.

Figure 18:
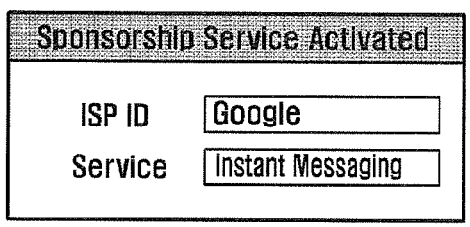
FIG. 18 is a diagram illustrating an exemplary sponsored service start notification message according to an embodiment of the present disclosure.

If the supplementary IspTrfCode is received, the UE 110 updates the IspTrfCode of the sponsored service which is has manages with the newly received information. If it is checked that the mobile subscriber accesses the lawful content, the UE 110 notifies the user of the initiation of the sponsored service upon receipt of the OK response from the sponsorship manager at operation 824. This procedure is described in more detail with reference to FIG. 18.

This is performed as the operation in response to calling the sponsored API independently of application program. Accordingly, the user may detect the malignant operation of the application program which is made as if a non-sponsored service is a sponsored service. That is, the all sponsored services is notified at their initiations with the reliability at the low level such as operating system and device drivel levels independently of the application programs.

Afterward, the ISP server 130 transfers the sponsored content to the UE 110 at operation 830. The PGW 140 monitors the traffic transmitted and generates statistical information based on the IspTrfCode and supplementary information by means of the sponsorship filter at operation 831.

If there is not traffic of sponsored content during a predetermined period, the sponsorship filter of the UE detects this and ends the sponsored service independently of the application program at operations 840 and 841.

Through the sponsored service release procedure, the UE notifies the sponsorship manager of the end of the sponsored service as shown in FIG. 8. The information on the traffic amount and time collected by the sponsorship filter of the UE is transmitted to the sponsorship manager. The secure connection between the UE and the sponsorship manager is released. The termination of the service may be triggered by the PGW as well as the UE.

In order to accomplish this, it is necessary to provide the PGW with the information for use in checking the individual session such as source and destination IP addresses in addition to IspTrfCode through the procedure of FIG. 6 to complement for the lack of the procedure of FIG. 5. If the additional information is acquired, the PGW is capable of monitoring the starts and ends of the sessions using the same IspTrfCode based on the additional information along with IspTrfCode. If the lawful content access is terminated, the UE notifies the user of the termination of the sponsored service as shown in FIG. 19. This procedure follows the operation of calling the sponsored API independently of the application program.

As a consequence, the user is capable of checking the information on the consumed benefit of the sponsored service as well as the situation where an application program operates a non-sponsored service, as if it is the sponsored service, with malignant intention. As described above, all the sponsored services notify of their termination at reliable low level such as operating system and device drive independently of application programs.

FIG. 9 is a diagram illustrating exemplary filter information for the sponsorship filter of the PGW to identify and manage the sponsored service. Part (a) shows a mode of checking only IspTrfCode, part (b) a mode of checking IP address of the service server of the ISP in addition to IspTrfCode, and part (c) a mode of combining the IP address of the UE and IspTrfCode. Part (d) shows a mode of checking IspTrfCode along with the IP addresses of the UE and the service server. The example is of downlink (service server→UE), and the source and destination IP addresses are switched oppositely in uplink. Of course, other combinations are possible.

Figure 10:
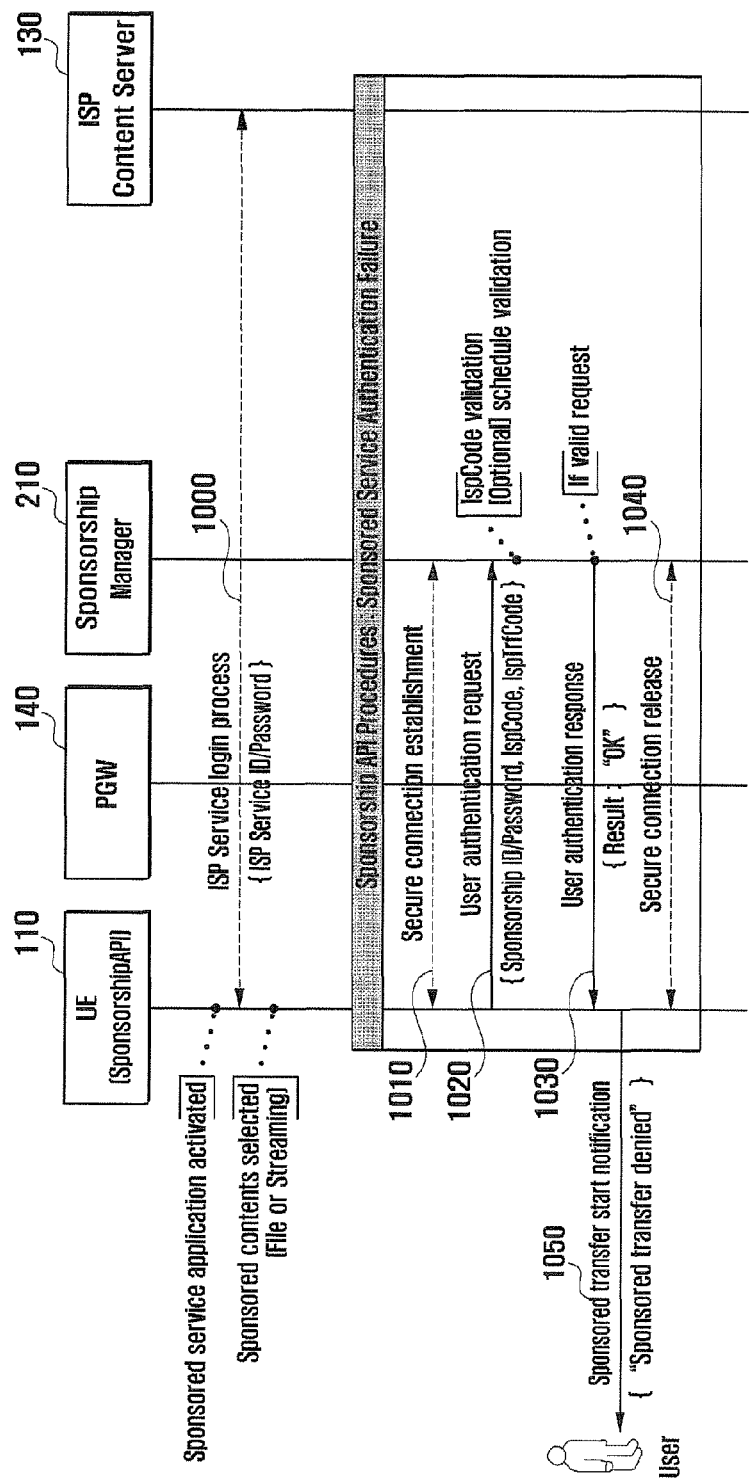
FIG. 10 is a signal flow diagram illustrating the start and end of the failed sponsored service.

FIG. 10 is directed to the sponsored content delivery scenario where the sponsorship manager rejects the sponsored service authentication requested by the UE. This is the case where the sponsorship manager determines that the sponsorship service requested by the UE is not valid in time/location or a non-subscribed service.

In the present disclosure, the mobile subscriber using the sponsored service and the ISP providing the sponsored service may check the billing/statistical information on the sponsored service provided anytime if necessary.

Figure 11:
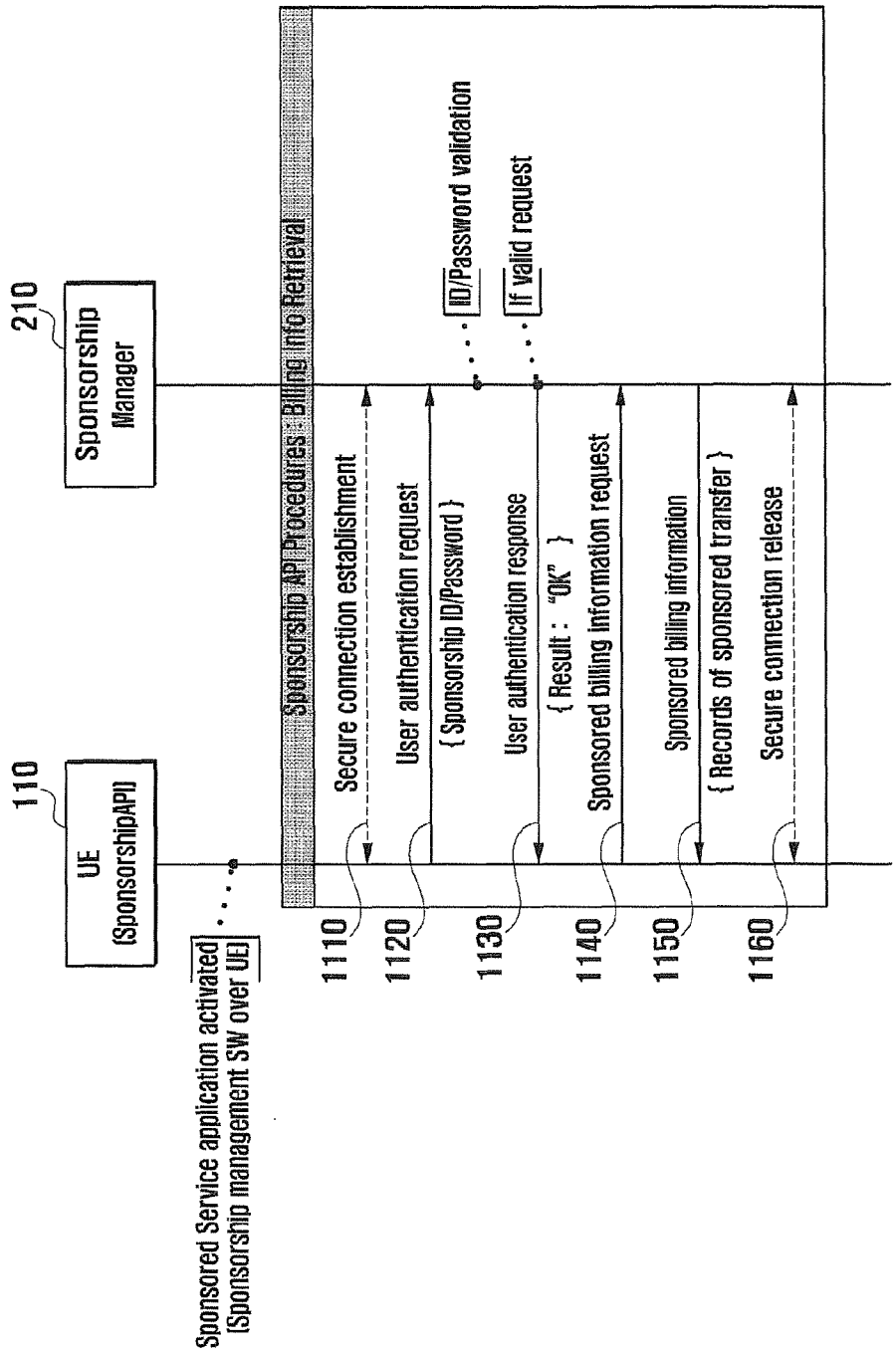
FIG. 11 is a signal flow diagram illustrating sponsored service billing information search procedure of the UE.

FIG. 11 is a signal flow diagram illustrating the procedure for a user payment search program to check the statistical information on the sponsored service provided to the mobile subscriber based on the sponsorship API. The UE first sets up a secure connection with the sponsorship manager. Afterward, the mobile subscriber performs authentication procedure using its own sponsorship ID and password. If the authentication is successful, the mobile subscriber requests for the statistical information on the sponsored service consumed by the UE until then, and the sponsorship manager transmits the corresponding information to the UE, and then the secure connection is released.

Figure 12:
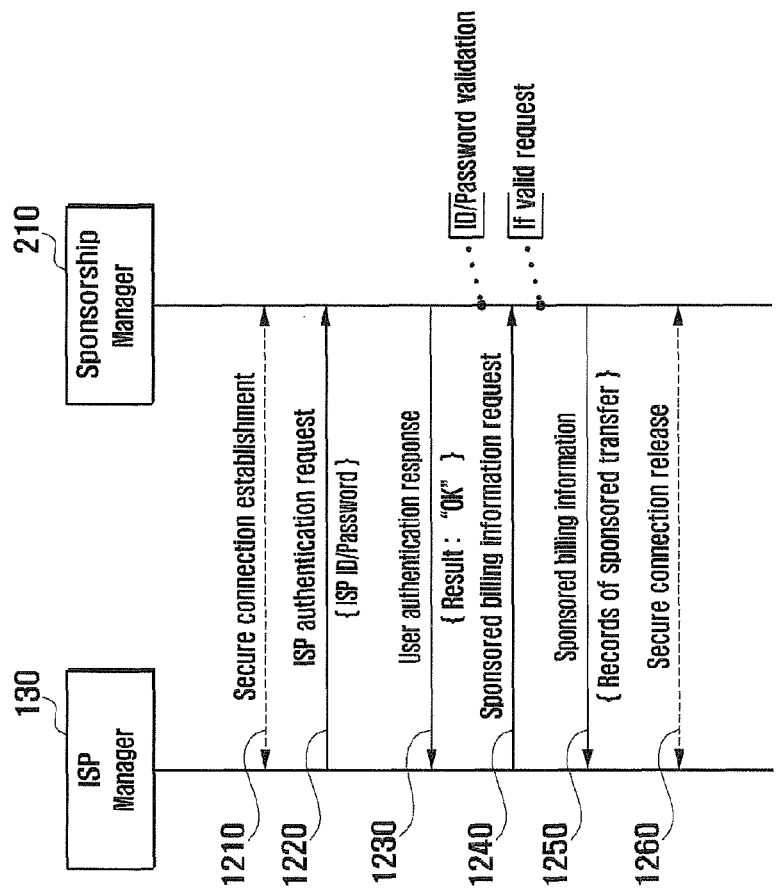
FIG. 12 is a signal flow diagram illustrating sponsored service billing information search procedure of the ISP server.

FIG. 12 is a signal flow diagram illustrating real time billing information inquiry procedure between the ISP providing the sponsored service and the sponsorship manager of the mobile communication network operator and identical with the procedure of FIG. 11.

The second scenario based on the sponsored service property is the scenario called sponsored application in which the billing for the time/traffic amount consumed by a specific application running on the UE through the mobile communication network is charged to the ISP supporting the corresponding application.

Figure 13:
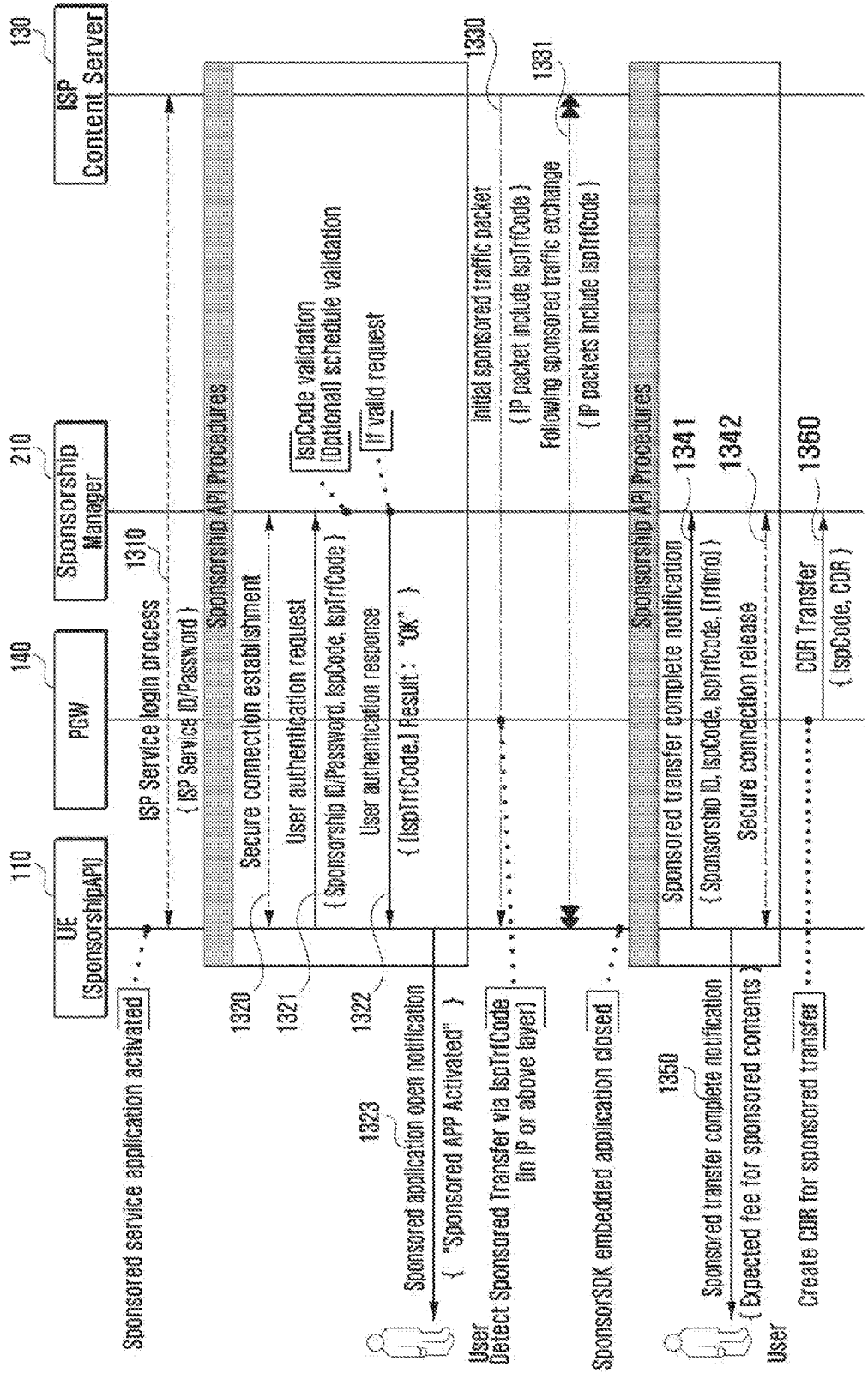
FIG. 13 is a signal flow diagram illustrating a procedure of supporting sponsored application executed successfully.

The operation procedure in the sponsored application mode is depicted in FIG. 13. It is similar to the case of FIG. 8 with the exception that the application performs authentication with the sponsorship manage through the sponsorship API immediately upon start of the application as shown in FIG. 13. If the authentication is successful, the ISP charges for all traffic transmitted/received by the corresponding application. Unlike the procedure of FIG. 8, the ISP manager notifies the sponsorship manager of the termination of the corresponding application at the termination time point.

Figure 14:
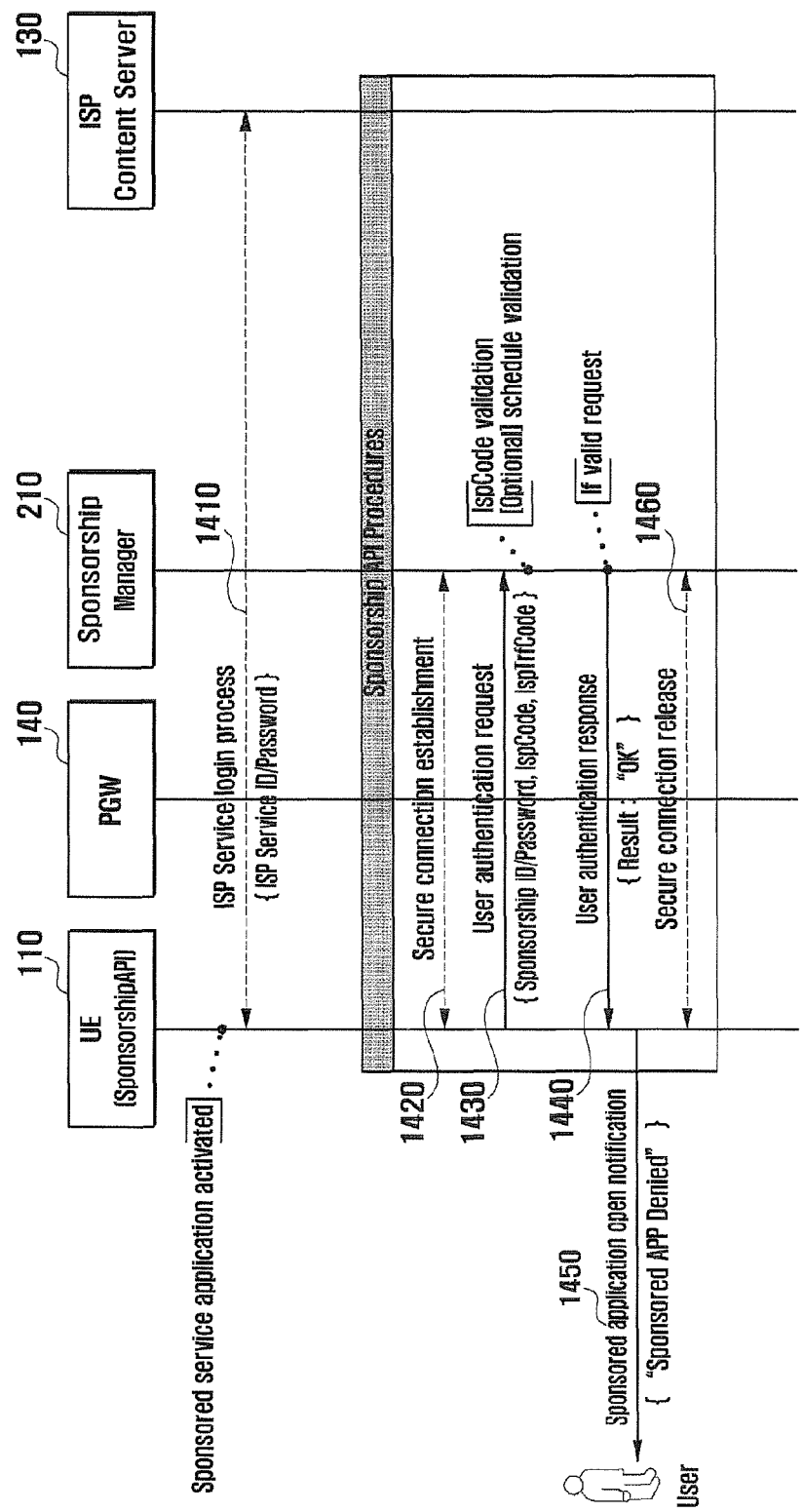
FIG. 14 is a signal flow diagram illustrating a procedure of supporting sponsored application executed unsuccessfully.

A procedure following authentication failure at the initial start time point of the sponsored application is depicted in FIG. 14 as a procedure corresponding to that of FIG. 9.

Figure 15:
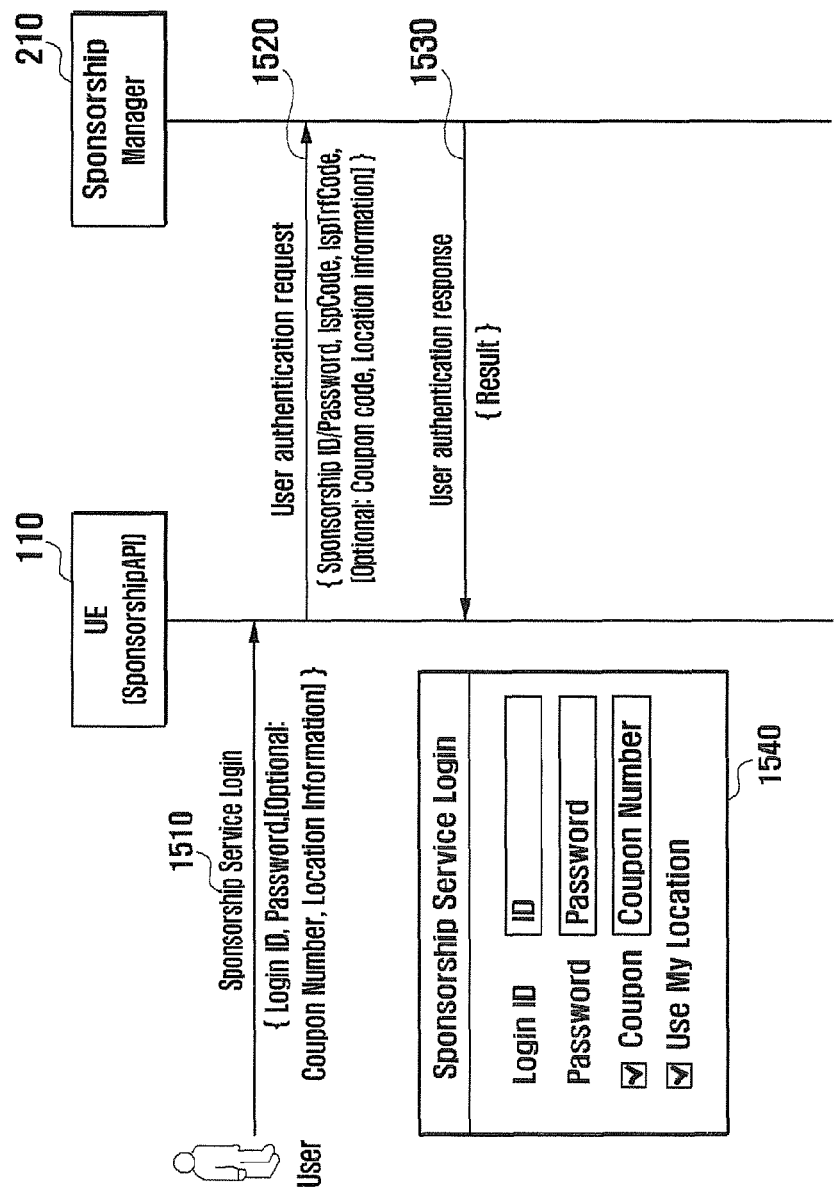
FIG. 15 is a signal flow diagram illustrating the sponsored service initiation procedure with location information and coupon according to an embodiment of the present disclosure.

As shown in FIG. 5, it is possible to apply the conditions for providing the sponsored service. That is, it is possible to restrict the sponsored service with specific time, specific location, specific user, or specific IP address. FIG. 15 show the case where the mobile subscriber may use its own location information since the mobile subscriber has allowed for use of the location information to support the sponsored service at specific area. The sponsored service may be provided for use of a coupon issued by an ISP online or offline for a special event. In this case, it is possible to provide the sponsored service based on the information corresponding to the coupon number acquired by means of the mobile subscriber and entered into the coupon section of FIG. 15.

Figure 16:
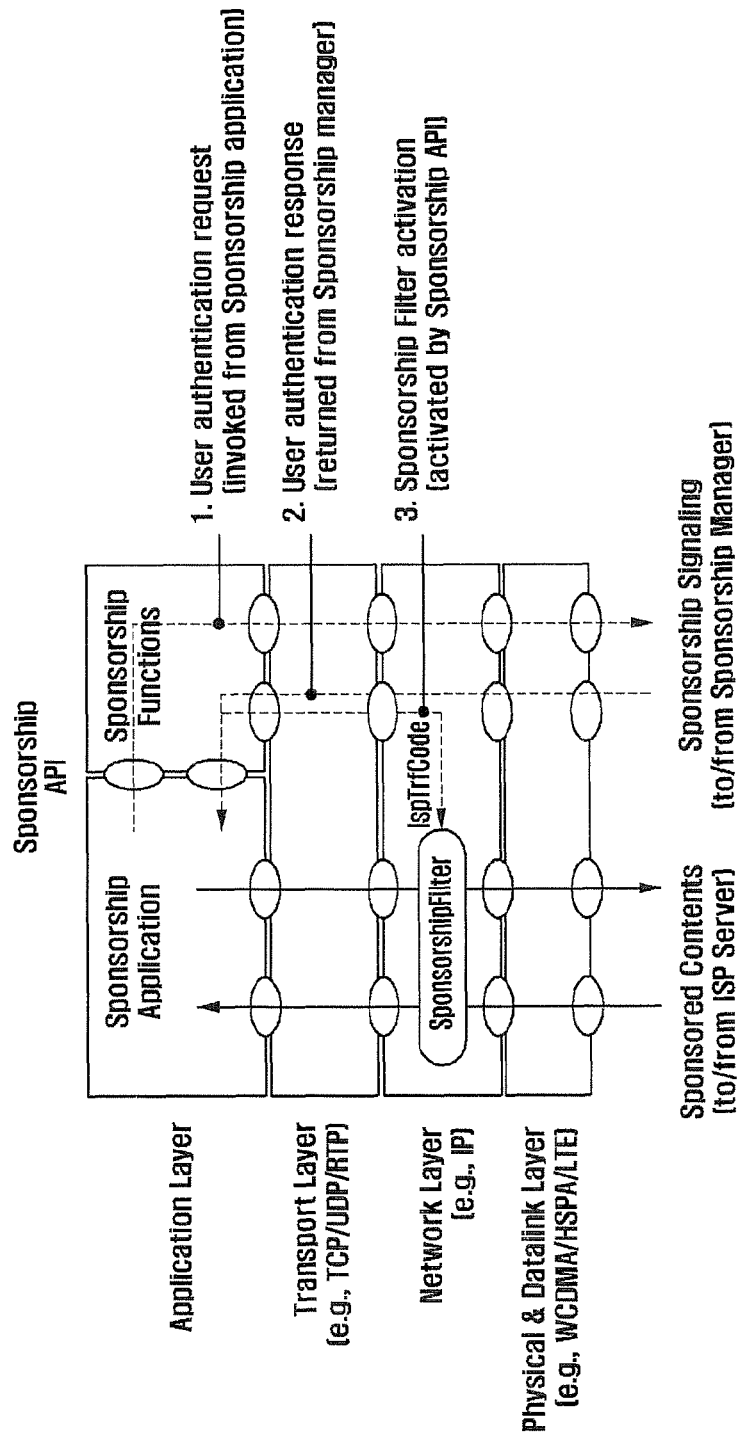
FIG. 16 is a diagram illustrating the sponsored service initiation procedure of the UE.

The relationship and structure of the sponsorship API, the sponsorship functions called by means of the API, and sponsorship filter are depicted in FIG. 16. Although it is assumed that the sponsorship filter belongs to the IP layer, the sponsorship filter may be implemented on a layer higher or lower than the IP layer. This may be implemented differently depending on the location of IspTrfCode and layer on which the filtering function is provided.

FIG. 16 shows a simplified internal procedure of the UE in the case where an application program of the UE starts a sponsored service through the sponsorship API. As described at item 1), if the sponsored application calls the sponsorship API to initiate authentication with the sponsorship manager, the corresponding request is transmitted to the sponsorship manager in a message generated by the sponsorship function. This means the transmission of the message and information described in the aforementioned scenarios.

If the corresponding sponsored service is permitted by the sponsorship manager so as to use IspTrfCode or acquire new IspTrfCode, the sponsored function transmits a positive response to the sponsored application in response to the permission request and the IspTrfCode corresponding to the sponsored service initiated to the sponsored filter so as to monitor the corresponding service.

The sponsored filter is running on the operating system and communication layer of the terminal that is capable of supporting the sponsored service regardless of the initiation of the sponsored service and, if IspTrfCode is sent by the sponsored application through a lawful permission and if any traffic including illegal IspTrfCode arrives or generated by the UE, detects and blocks the corresponding illegal service and notifies the sponsorship manager of the process result.

Also, the sponsorship filter of the terminal performs the function of detecting no generation of traffic of the corresponding sponsored service during a predetermined period for the internet service of which connection release procedure is unclear and, if there is no traffic during the predetermined period, terminates the sponsored service internally.

Also, the sponsorship filter collects the information on the traffic amount or traffic transmission/reception time for the sponsored service through the lawful traffic monitoring function and sends collected information to the sponsorship manager upon completion of the sponsored service such that the billing server performs billing operation in detailed and flexible manner.

Figure 17:
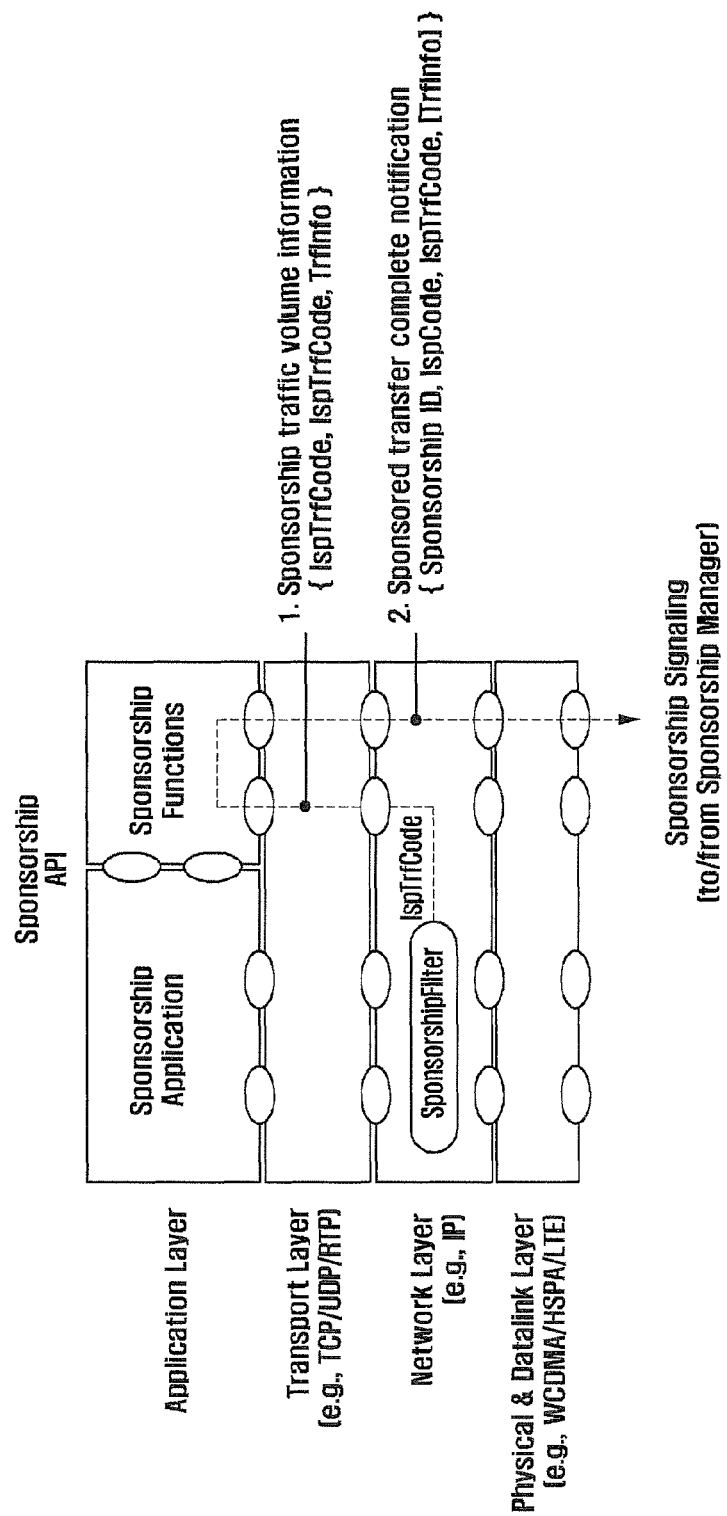
FIG. 17 is a diagram illustrating the sponsored service termination procedure of the UE.

The operation at the end time point of the sponsored service is depicted briefly in FIG. 17. The detailed description on the message transmission/reception procedure for the corresponding operation has been described already above, and the sponsorship function detected the termination of the sponsored service according to the request of the sponsored application or its self-determination sends the sponsorship manager the information indicating the termination of the corresponding sponsored service.

As described above, the sponsorship filter receives the information on the traffic and time associated with the transmission of the corresponding sponsored service and transmits the received information to the sponsorship manager.

The sponsorship filter is implemented in the PGW identically. The sponsorship filter implemented in the PGW is based on the filter information of the sponsorship service which is received from the sponsorship manager and monitors to meter the traffic amount or time of the lawful service verified ty the sponsorship manager and detect illegal traffic. The sponsorship filter also collects the billing information for the lawful traffic and transmits the billing information to the billing server.

Figure 21:
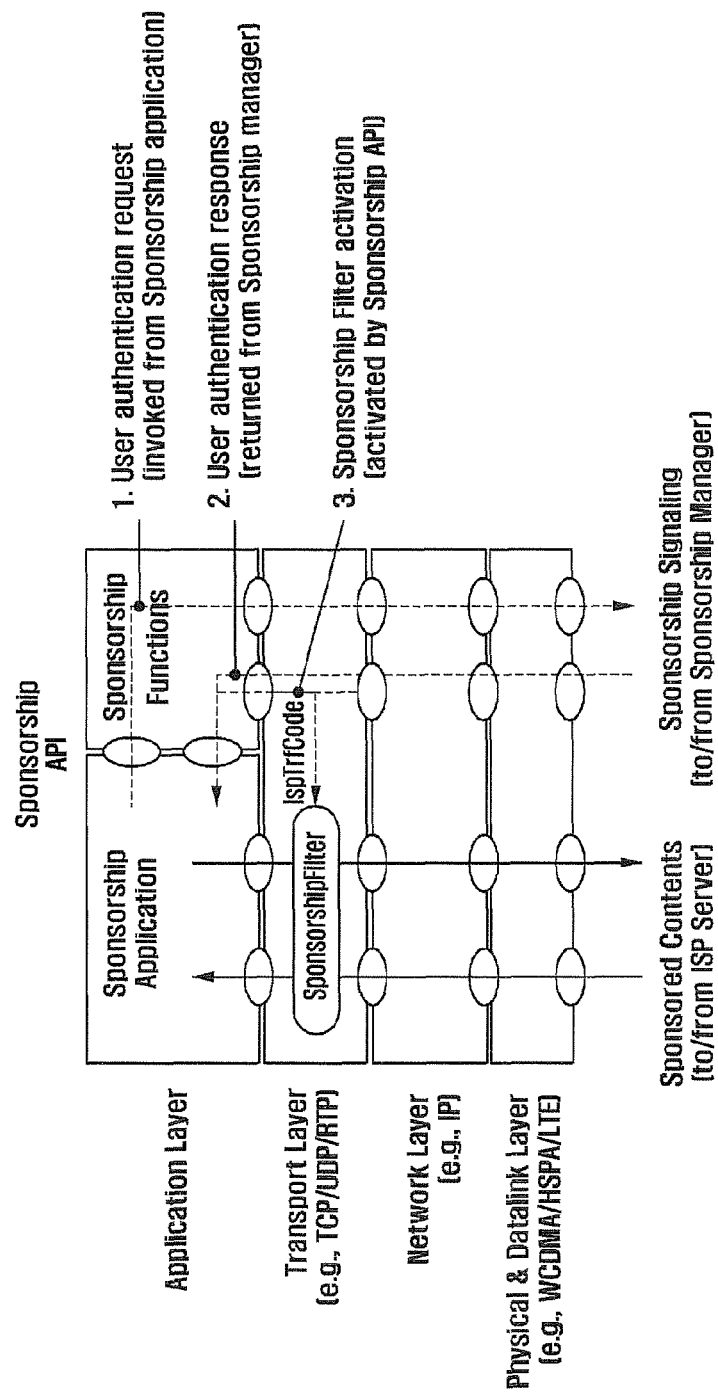
FIG. 21 is a diagram illustrating the procedure of implementing the sponsorship filter on the transport layer according to an embodiment of the present disclosure.
Figure 22:
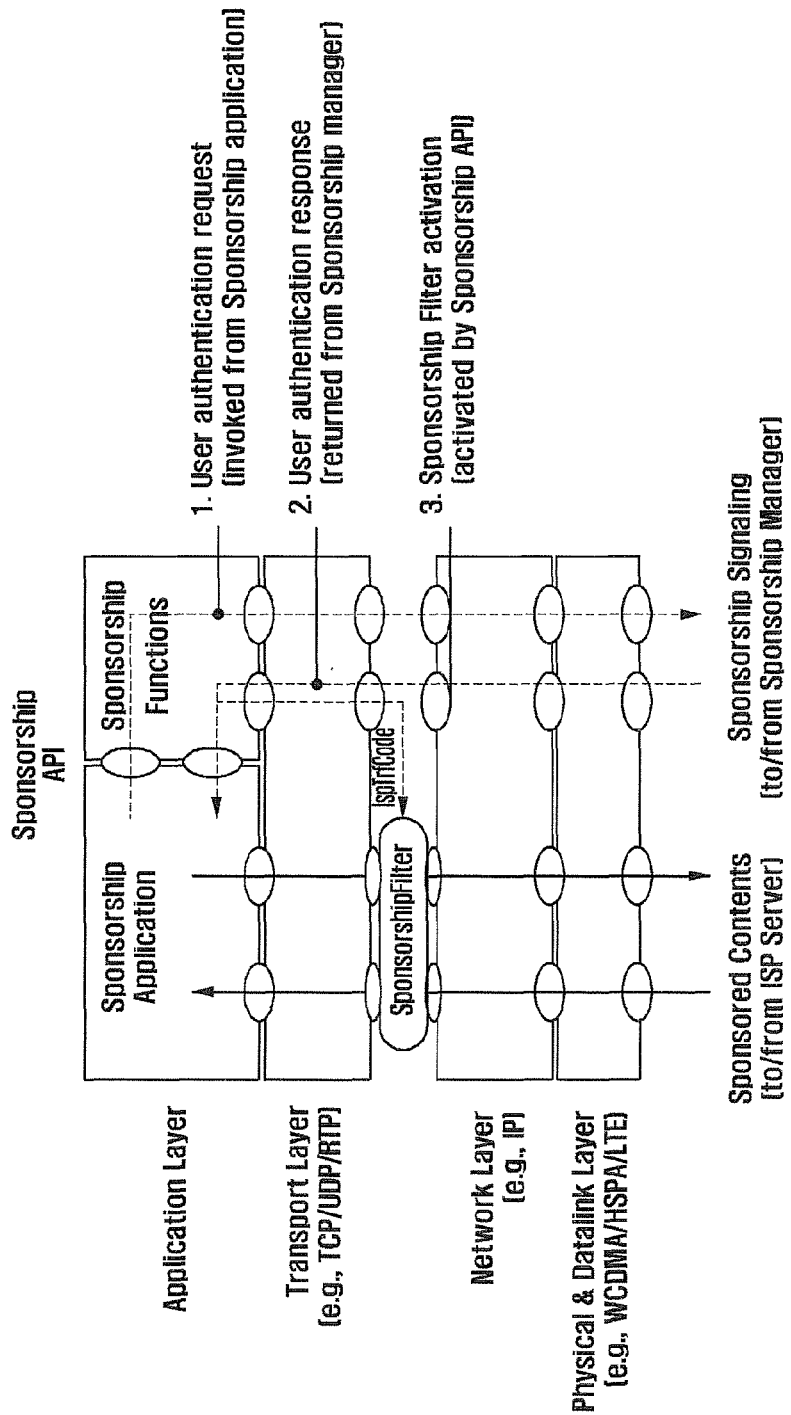
FIG. 22 is a diagram illustrating the procedure of implementing the sponsorship filter on the layer 3.5 according to an embodiment of the present disclosure

FIG. 20 shows an exemplary structure of an IP packet to which IspTrfCode used for detecting lawful or illegal traffic at the sponsorship filter is applied. Although the drawing is directed to the case of inserting IspTrfCode into the option field of the IP packet, it is also possible to use any reserved filed of a IPv4/IPv6 header or option or reserved field of layer 4 such as TCP/UDP/RTP layer and, if necessary, to place IspTrfCode of IP layer between layer 3 and layer 4 or in a layer 4 message such as TCP/UDP/RTP message. Exemplary UE configurations corresponding to FIG. 16 are shown in FIGS. 21 and 22.

Figure 23:
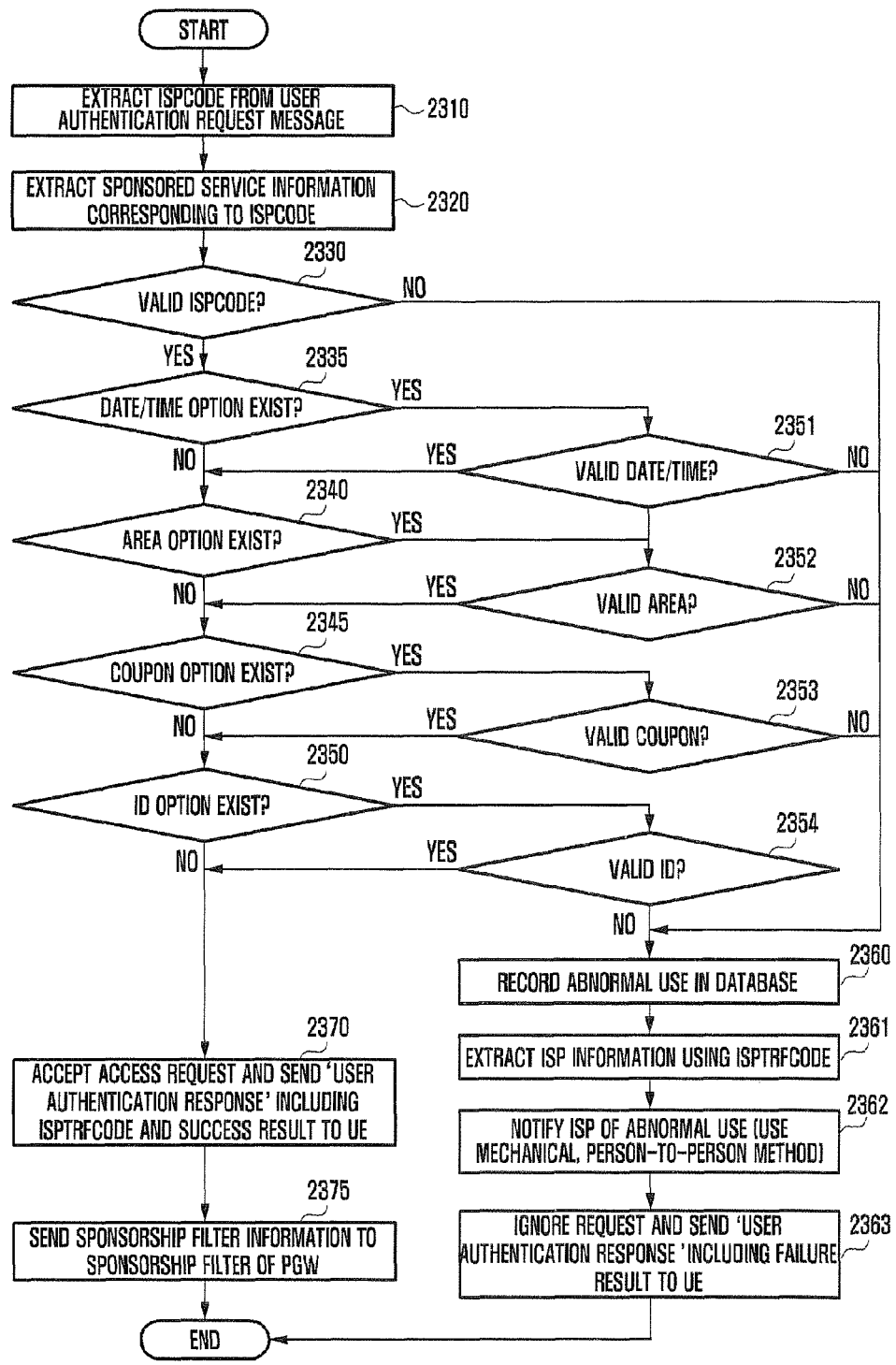
FIG. 23 is a flowchart illustrating the sponsored service authentication procedure of the sponsorship manager.

The detailed operation of the sponsorship manager of FIG. 7 is depicted in more detail in FIG. 23. If a sponsored service subscription request registration is received from the UE, the sponsorship manager determines whether the sponsored service is valid to the corresponding mobile subscriber based on the IspCode of the sponsored service and, if so, determines whether the supplementary conditions are fulfilled. If all the conditions are fulfilled, the sponsorship manager accepts the sponsored service access request and, if necessary (in the case that IspTrfCode is changed), sends the PGW the traffic information about the corresponding sponsored service so as to perform monitoring. The information transmitted at this time is generated by combining the source/destination IP addresses and IspTrfCode as described above.

Figure 24:
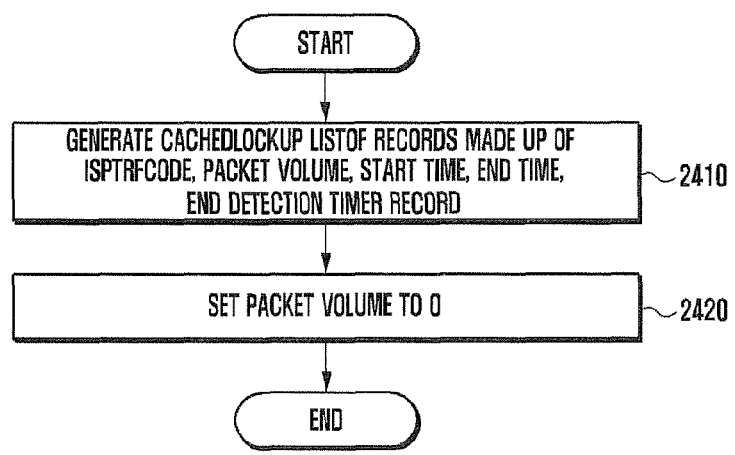
FIG. 24 is a flowchart illustrating the initialization procedure according to the start of the sponsored service at the UE and the operation of the sponsorship filter.

If the sponsorship manager allows for use of the sponsored service lawfully in FIG. 7, the UE initializes the information related to the sponsorship filter through the procedure of FIG. 24.

That is, the UE sends the IspTrfCode to notify of the filter of the sponsored service added; generates transmitted/received packet volume, service start time (StartTime), service end time (EndTime) and service end time inspection timer (IdleTimer) record for the sponsored service as the supplementary information fields for the corresponding sponsored service; initializes the values of the respective fields.

Figure 25:
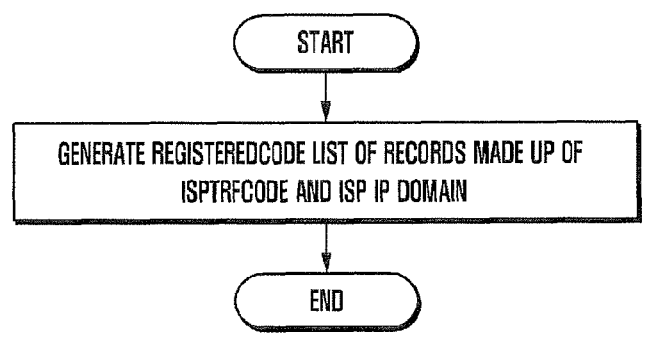
FIG. 25 is a flowchart illustrating the initialization procedure according to the start of the sponsored service at the PGW and the operation of the sponsorship filter.

In FIG. 7, the sponsorship filter of the PGW which has received the filter information for the sponsored service through the sponsorship manager procedure of FIG. 23 also receive the IspTrfCode for lawful allowance and the ISP IP domain information identical with the source/destination IP address information as supplementary informations and registers this as supplementary filter information of the sponsorship filter according to the procedure of FIG. 25.

Like the UE, a filter including the UE and service server IP addresses may be generated in response to the request of the sponsorship manager, the variable for storing start and end times and transmission/reception traffic amount of the sponsored service(s) using the corresponding IspTrfCode are generated and managed for the case of the IspCode unit, IspTrfCode unit, or combination of IspTrfCode with the UE or service server information. The creation time of the corresponding information may be the time point when the record of the corresponding sponsored service is created at the PGW as shown in FIG. 25 or the time point when the first packet of the sponsored service is detected at the PGW as shown in FIG. 26.

Figure 26:
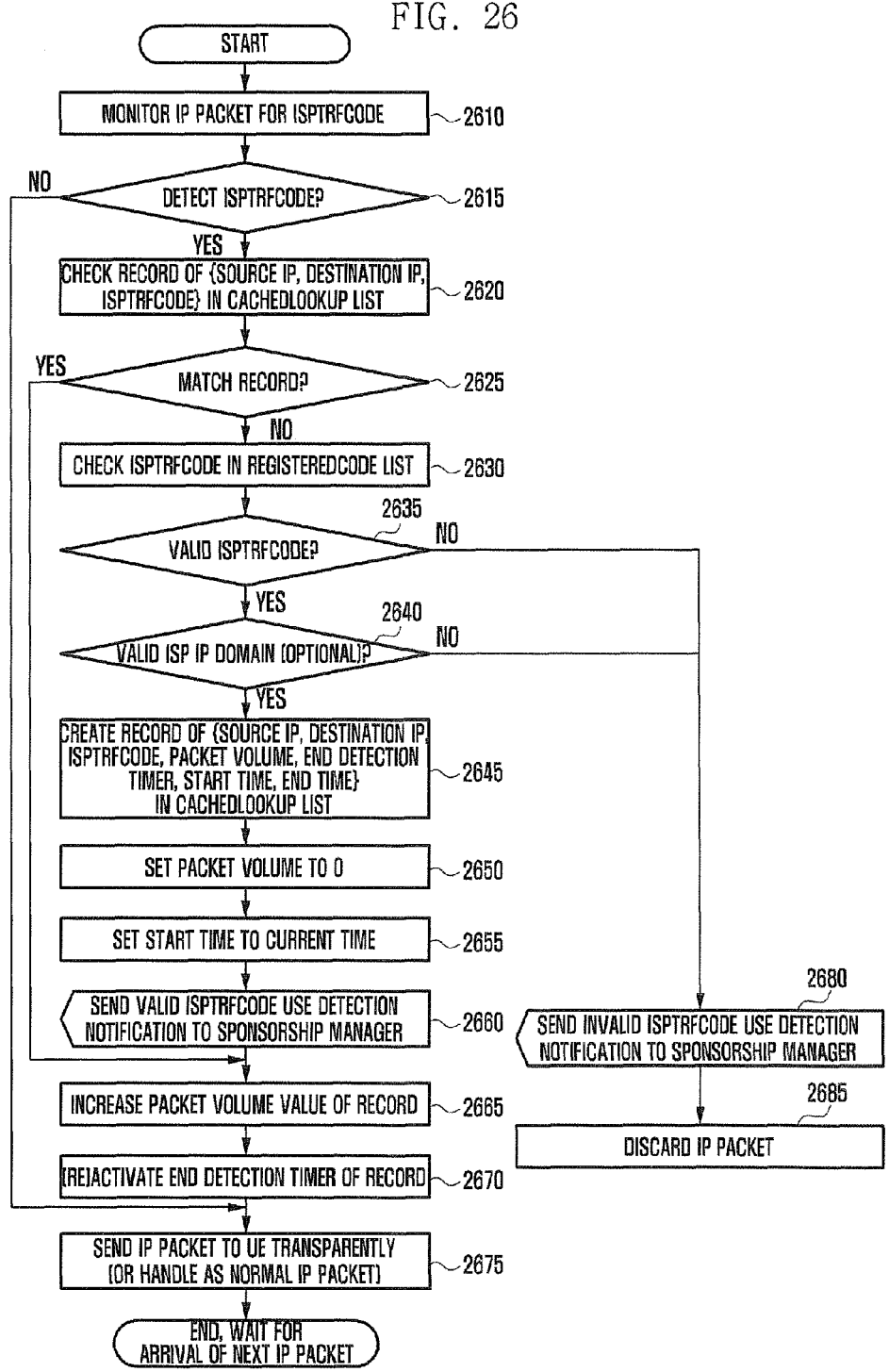
FIG. 26 is a flowchart illustrating the sponsored service detection and initialization procedure of the sponsorship filter of the PGW.

The operation of the sponsorship filter of PGW which monitors the traffic exchanged between the UE and the server for the sponsored service permitted by the sponsorship manager in FIG. 7 is depicted in FIG. 26.

If an IP packet arrives at the PGW, the sponsorship filter of the PGW extracts the IspTrfCode from the corresponding IP packet. If no IspTrfCode is detected, the packet is processed as a normal IP packet. If the extracted IspTrfCode is a meaningful IspTrfCode by referencing the database and additional IP address exists, the sponsorship filter verifies the lawfulness even with the corresponding address information. If the IspTrfCode and related information are lawful, the PGW generates variables such as start and end times and termination detection timer, and traffic amount as statistical information and updates the corresponding variables whenever the IP packet of the sponsored service is detected.

Figure 27:
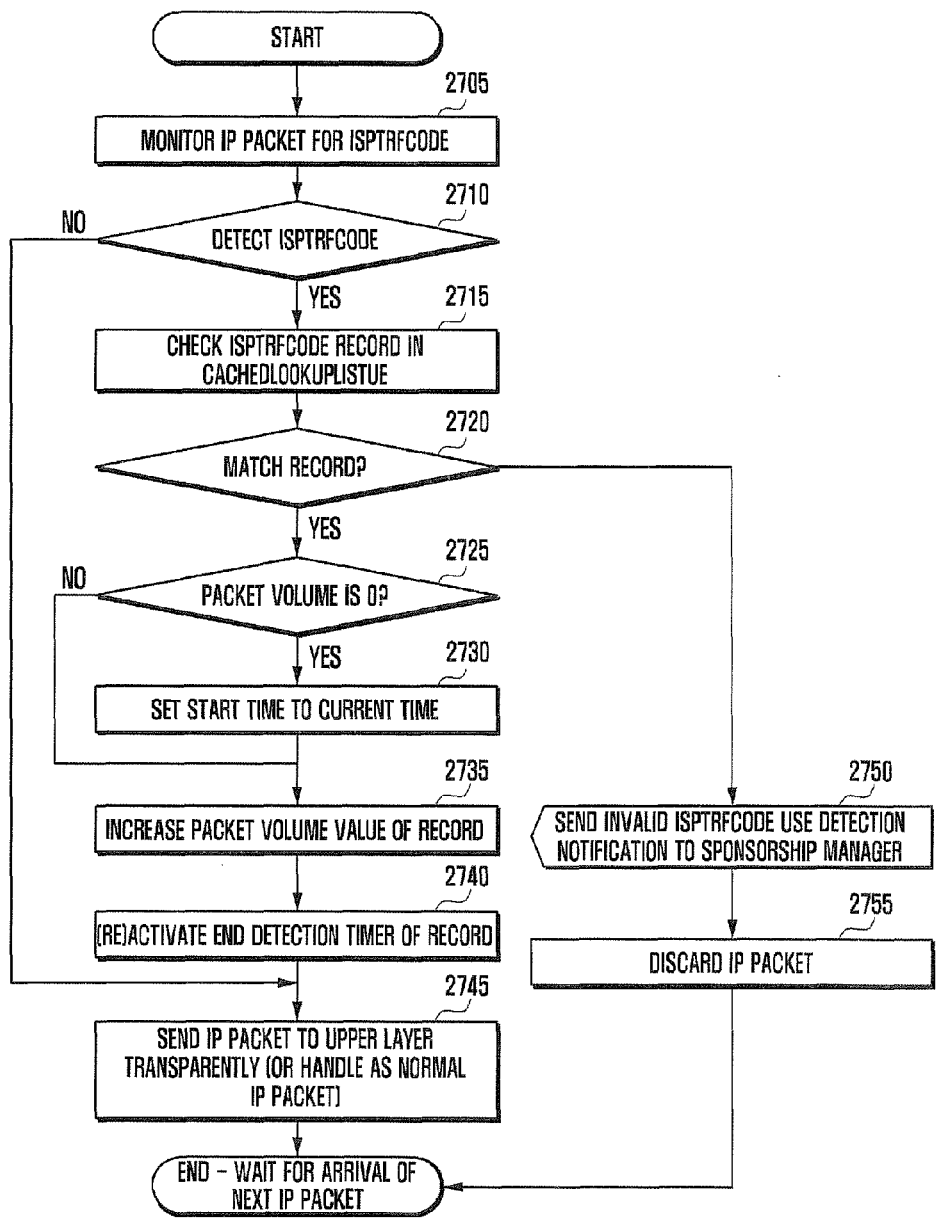
FIG. 27 is a flowchart illustrating the sponsored service detection and initialization procedure of the sponsorship filter of the UE.

The sponsorship filter of the UE corresponding to the sponsorship filter of the PGW of which operation is depicted in FIG. 26 detects IspTrfCode of the sponsored service and acquires the statistical information according to the procedure of FIG. 27.

Figure 28:
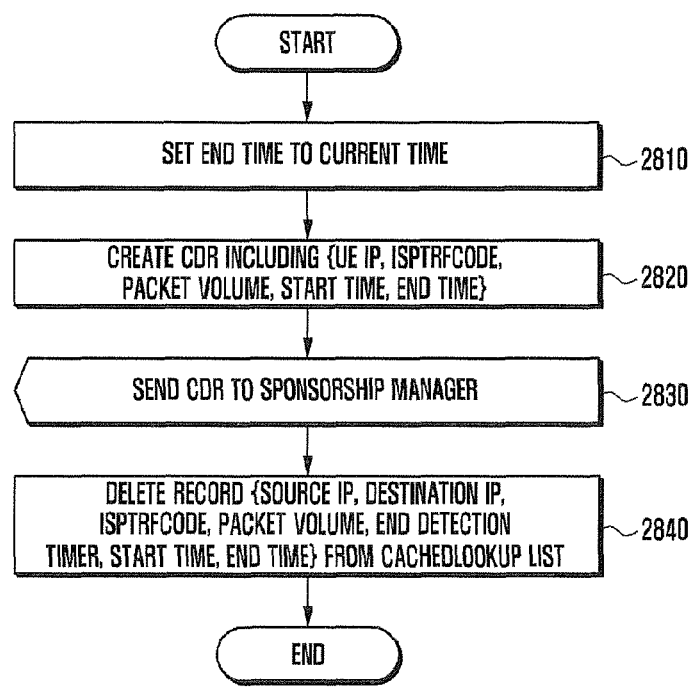
FIG. 28 is a flowchart illustrating the service end detection and traffic information generation procedure of the sponsorship filter of the PGW.

The operation of the sponsorship filter of the PGW at the end time of the sponsored service is depicted in FIG. 28. If there is no transmission/reception traffic during the IdleTimer, the PGW determines the current time as the end time of the sponsored service and sends the sponsorship manager the collected sponsored service-related statistical information to the sponsorship manager in the form of CDR. The information such as variable created for the corresponding sponsored service is deleted to improve memory efficiency. The UE performs the same procedure as shown in FIG. 29.

Figure 29:
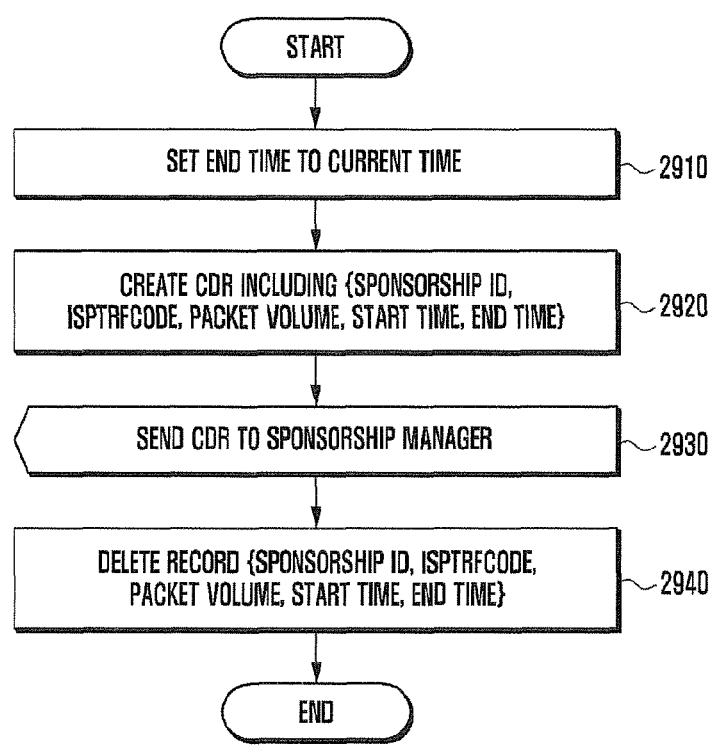
FIG. 29 is a flowchart illustrating the service end detection and traffic information generation procedure of the sponsorship filter of the UE.
Figure 30:
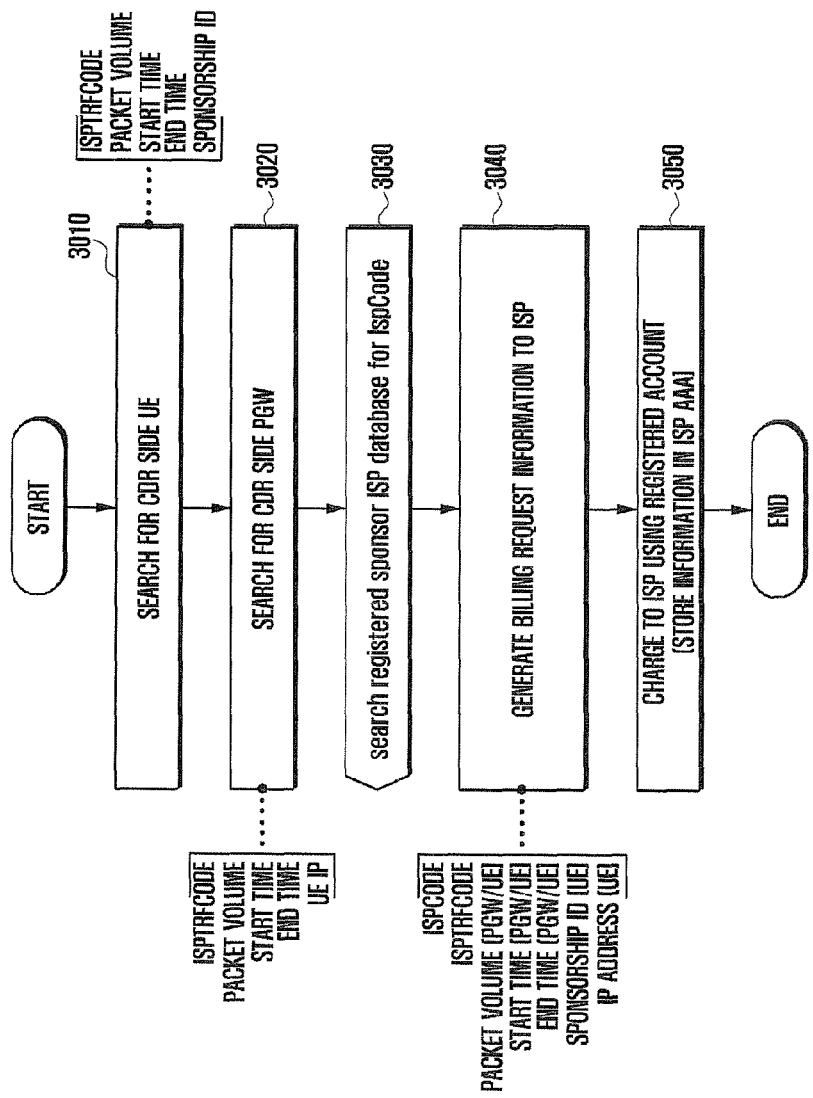
FIG. 30 is a flowchart illustrating the billing information generation procedure of the sponsorship manager.

If the CDR informations are acquired from the UE and the PGW through the procedures of FIGS. 28 and 29, the sponsorship manager integrate the CDR informations received from the two devices and sends the integrated information to the billing server.

Figure 31:
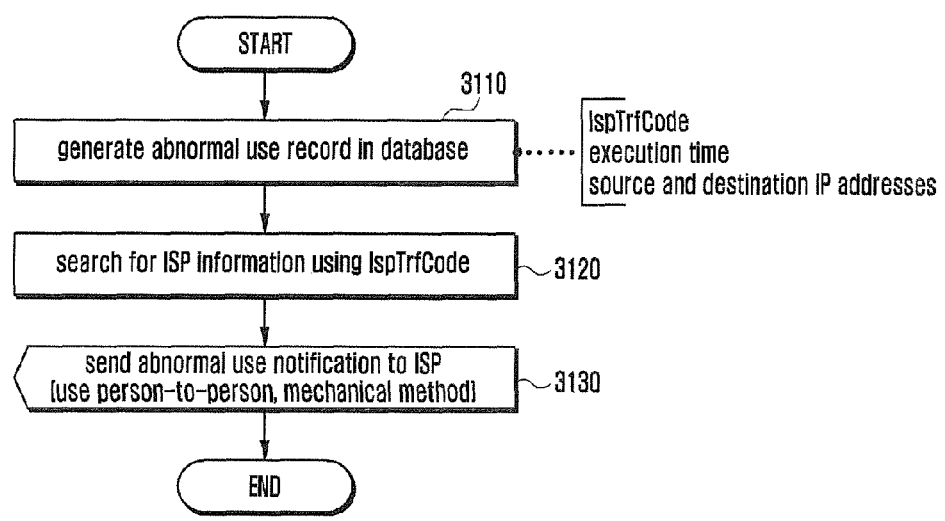
FIG. 31 is a flowchart illustrating the illegal sponsored service detection procedure of the sponsorship filter.

If an illegal sponsored service is detected by the sponsorship filter of the PGW or the UE, it is reported to the sponsorship manager, which stores the detailed information on the illegal use in the database and notifies the corresponding ISP of the detection of the illegal sponsored service through the procedure of FIG. 31.

Although various embodiments of the present disclosure have been described using specific terms, the specification and drawings are to be regarded in an illustrative rather than a restrictive sense in order to help understand the present disclosure. It is obvious to those skilled in the art that various modifications and changes can be made thereto without departing from the broader spirit and scope of the disclosure.

The invention claimed is:

1. A method for providing a sponsored service by a sponsorship manager the method comprising:
registering a terminal for provision of the sponsored service;
registering an internet service provider server;
allocating code information for identifying the internet service provider server and code information for identifying the sponsored service to the terminal if the terminal is registered;
when a predetermined sponsored content for the sponsored service is selected by the terminal, authenticating validity of the sponsored service to the terminal; and
when the sponsored content and at least one of code information for identifying the internet service provider server and code information for identifying the sponsored service is transmitted by the Internet service provider server to the terminal, charging a mobile communication network usage fee of the terminal to the internet service provider server based on the at least one code information,
wherein the authenticating of the validity of the sponsored service comprises:
receiving the code information for identifying the internet service provider server and the code information for identifying the sponsored service, for authenticating from the terminal;
determining whether the code information for identifying the internet service provider server and the code information for identifying the sponsored service are valid code information by matching the pre-allocated code information; and
transmitting a sponsored service start notification message to the terminal if the code information is valid.

2. The method of claim 1, further comprising a unique terminal ID to the terminal when the terminal is registered.

3. The method of claim 1, further comprising:
receiving sponsored service information from the internet service provider server when the internet service provider is registered; and
allocating at least one of code information for identifying the internet service provider server and code information for identifying the sponsored service to the internet service provider server.

4. The method of claim 3, further comprising:
receiving additional condition information for providing the sponsored service from the internet service provider; and
linking the additional condition information to the code information for identifying the internet service provider server,
wherein the additional condition information comprises specific IP address information of the internet service provider, specific IP address information of the terminal, specific time or date information, terminal location information, coupon information necessary for use of the sponsored service, and terminal ID information.

5. The method of claim 1, wherein charging mobile communication network usage fee of the terminal comprises:
receiving traffic information on the sponsored service from the terminal, when the code information is included in the predetermined sponsored content; and
charging mobile communication network usage fee of the terminal to the internet service provider server.

6. The method of claim 1, wherein charging mobile communication network usage fee of the terminal comprises:
receiving traffic information on the sponsored service from a gateway on the mobile communication network, when the code information is included in the predetermined sponsored content; and
charging mobile communication network usage fee of the terminal to the internet service provider server.

7. The method of claim 1, further comprising releasing connection with the terminal, when no traffic transmission/reception of the sponsored service is detected during a predetermined time period.

8. A server for providing a sponsored service server comprising:
a communicator configured to receive a request for registering a terminal for provision of the sponsored service and a request for registering an internet service provider server; and
a controller configured to:
when a predetermined sponsored content for the sponsored service is selected by the terminal, authenticate validity of the sponsored service to the terminal; and
when the sponsored content and at least one of code information for identifying the internet service provider server and code information for identifying the sponsored service is transmitted by the internet service provider server to the terminal, charge mobile communication network usage fee of the terminal to the internet service provider server based on the at least one code information,
wherein the controller is configured to allocate the code information for identifying the internet service provider server and the code information for identifying the sponsored service to the terminal if the terminal is registered,
wherein the communicator is configured receive the code information for identifying the internet service provider server and the code information for identifying the sponsored service, for authenticating from the terminal, and
wherein the controller is configured to determine whether the code information for identifying the internet service provider server and the code information for identifying the sponsored service are valid code information by matching the pre-allocated code information and control the communicator to transmit a sponsored service start notification message to the terminal if the code information is valid.

9. The server of claim 8, wherein the controller is configured to allocate a unique terminal ID to the terminal when the terminal is registered.

10. The server of claim 8, wherein:
the communicator is configured to receive sponsored service information from the internet service provider server when the internet service provider is registered, and
the controller is configured to allocate at least one of code information for identifying the internet service provider server and code information for identifying the sponsored service to the internet service provider server.

11. The server of claim 10, wherein:
the communicator is configured to receive additional condition information for providing the sponsored service from the internet service provider,
the controller is configured to link the additional condition information to the code information for identifying the internet service provider server, and the additional condition information comprises specific IP address information of the internet service provider, specific IP address information of the terminal, specific time or date information, terminal location information, coupon information necessary for use of the sponsored service, and terminal ID information.

12. The server of claim 8, wherein:
the communicator is configured to receive traffic information on the sponsored service from the terminal, when the code information is included in the predetermined sponsored content, and
the controller is configured to charge mobile communication network usage fee of the terminal to the internet service provider server.

13. The server of claim 8, wherein:
the communicator is configured to receive traffic information on the sponsored service from a gateway on the mobile communication network, when the code information is included in the predetermined sponsored content, and
the controller is configured to charge mobile communication network usage fee of the terminal to the internet service provider server.

14. The server of claim 8, wherein the controller is configured to release connection with the terminal, when no traffic transmission/reception of the sponsored service is detected during a predetermined time period.

15. A method for using a sponsored service by a terminal, the method comprising:
registering the terminal with a sponsorship manager to use the sponsored service;
receiving allocated code information for identifying an internet service provider server and code information for identifying the sponsored service from the sponsorship manager;
transmitting a request including a selection of content for the sponsored service to the internet service provider server;
transmitting the code information for identifying the internet service provider server and the code information for identifying the sponsored service, for authenticating to the sponsorship manager;
receiving a sponsored service start notification message from the sponsorship manager, if the code information is valid; and
receiving, from the internet service provider server, the selected content and the at least one of code information for identifying the internet service provider server and code information for identifying the sponsored service;
wherein an usage fee for the selected content is charged by the sponsorship manager to the internet service provider server based on the at least one code information, and
wherein the sponsorship manager determines whether the code information for identifying the internet service provider server and the code information for identifying the sponsored service are valid code information by matching the pre-allocated code information.

16. A terminal for using the sponsored service, the terminal comprising:
a transceiver configured to transmit, a request including a selection of content for the sponsored service to an internet service provider server; and
a controller configured to:
register the terminal with a sponsorship manager to use the sponsored service; and
control the communicator to:
receive allocated code information for identifying an internet service provider server and code information for identifying the sponsored service from the sponsorship manager, transmitting a request for selecting a content for the sponsored service to the internet service provider server,
transmit the code information for identifying the internet service provider server and the code information for identifying the sponsored service, for authenticating to the sponsorship manager,
receive a sponsored service start notification message from the sponsorship manager, if the code information is valid and
receive, from the internet service provider server, the selected content and the at least one of code information for identifying the internet service provider server and code information for identifying the sponsored service,
wherein an usage fee for the selected content is charged by the sponsorship manager to the internet service provider server based on the at least one code information, and
wherein the sponsorship manager determines whether the code information for identifying the internet service provider server and the code information for identifying the sponsored service are valid code information by matching the pre-allocated code information.

* * * * *